United States Patent
Chopra et al.

(10) Patent No.: US 6,631,466 B1
(45) Date of Patent: Oct. 7, 2003

(54) PARALLEL STRING PATTERN SEARCHES IN RESPECTIVE ONES OF ARRAY OF NANOCOMPUTERS

(75) Inventors: Vikram Chopra, Pune (IN); Ajay Desai, Pune (IN); Raghunath Iyer, Los Altos, CA (US); Sundar Iyer, Palo Alto, CA (US); Moti Jiandani, Fremont, CA (US); Ajit Shelat, Pune (IN); Navneet Yadav, Pune (IN)

(73) Assignee: PMC-Sierra

( * ) Notice: Subject to any disclaimer, the term of this patent is extended or adjusted under 35 U.S.C. 154(b) by 0 days.

(21) Appl. No.: 09/569,593

(22) Filed: May 9, 2000

Related U.S. Application Data

(63) Continuation-in-part of application No. 09/305,783, filed on Apr. 30, 1999, which is a continuation-in-part of application No. 09/224,382, filed on Dec. 31, 1998, now abandoned.

(51) Int. Cl.[7] .................................................. G06F 7/06
(52) U.S. Cl. .......................... 712/300; 707/6; 712/10; 708/212
(58) Field of Search ........................ 712/10, 300; 707/6; 708/212

(56) References Cited

U.S. PATENT DOCUMENTS

| | | | | |
|---|---|---|---|---|
| 4,896,133 A | * | 1/1990 | Methvin et al. | 340/146.2 |
| 5,497,488 A | * | 3/1996 | Akizawa et al. | 707/6 |
| 5,880,671 A | * | 3/1999 | Ranson et al. | 340/146.2 |
| 6,493,698 B1 | * | 12/2002 | Beylin | 707/1 |
| 6,519,237 B1 | * | 2/2003 | McDonough et al. | 370/335 |

\* cited by examiner

*Primary Examiner*—Kenneth S. Kim
(74) *Attorney, Agent, or Firm*—Dag Johansen; Stattler, Johansen & Adeli LLP

(57) ABSTRACT

A high-speed parallel pattern searching system is disclosed. The high-speed parallel pattern searching system allows the body of a data packet to be searched for one or more patterns such as a string or a series of strings. These string patterns can be defined by the grammar of regular expressions. In the invention, one or more patterns are loaded into one or more nanocomputers that operate in parallel. A control system then feeds a packet body into the participating nanocomputers such that each participating nanocomputer tests for a match. The various tests performed by the nanocomputers may be combined to perform complex searches. These nanocomputer searches are performed in parallel. Furthermore, several different searches may be combined together using control statements. A combination of these searches engines can be supported such that data is also looked at in parallel.

20 Claims, 20 Drawing Sheets

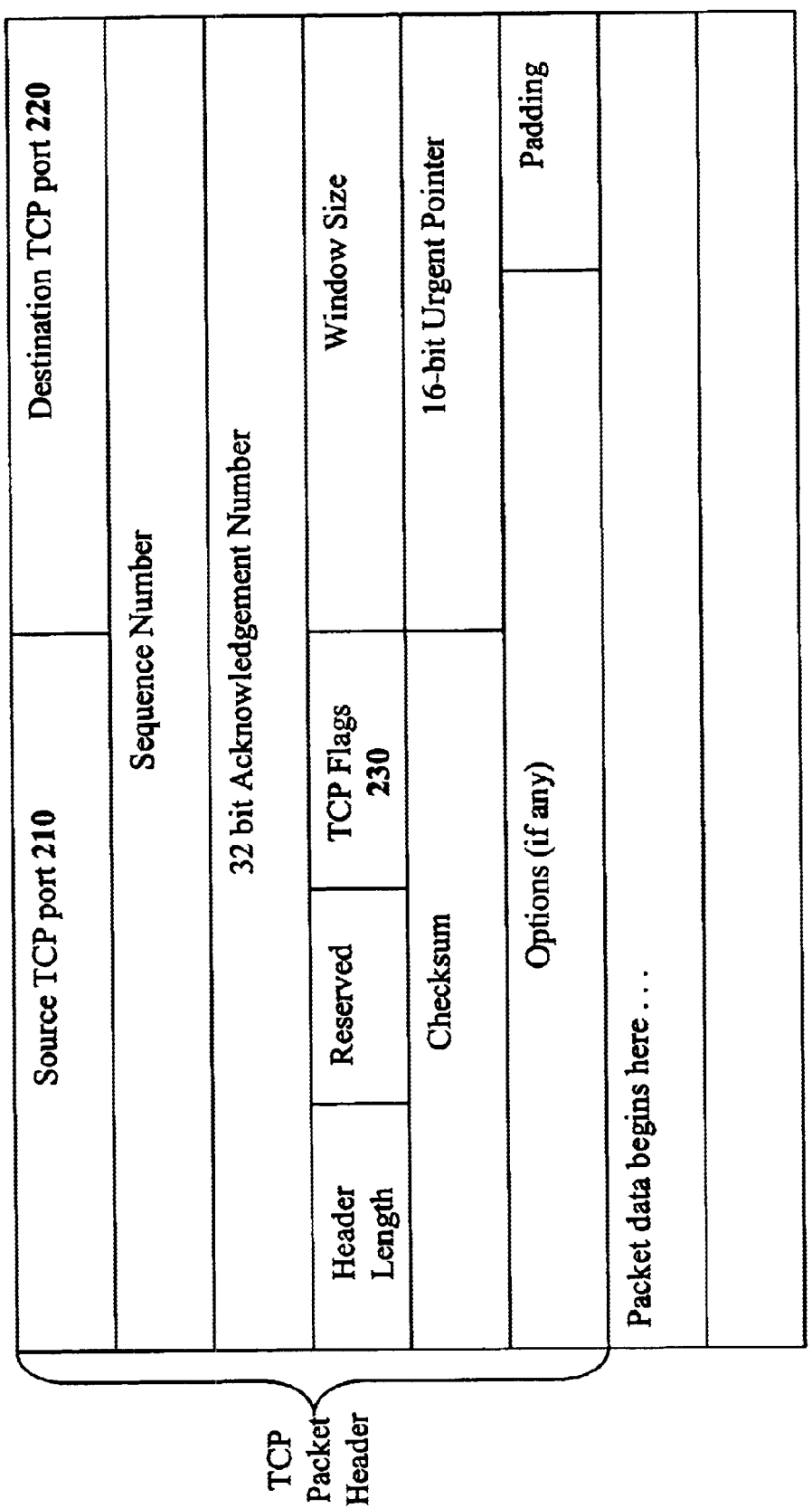
Fig. 2b  Transport Control Protocol Packet

Fig. 3c

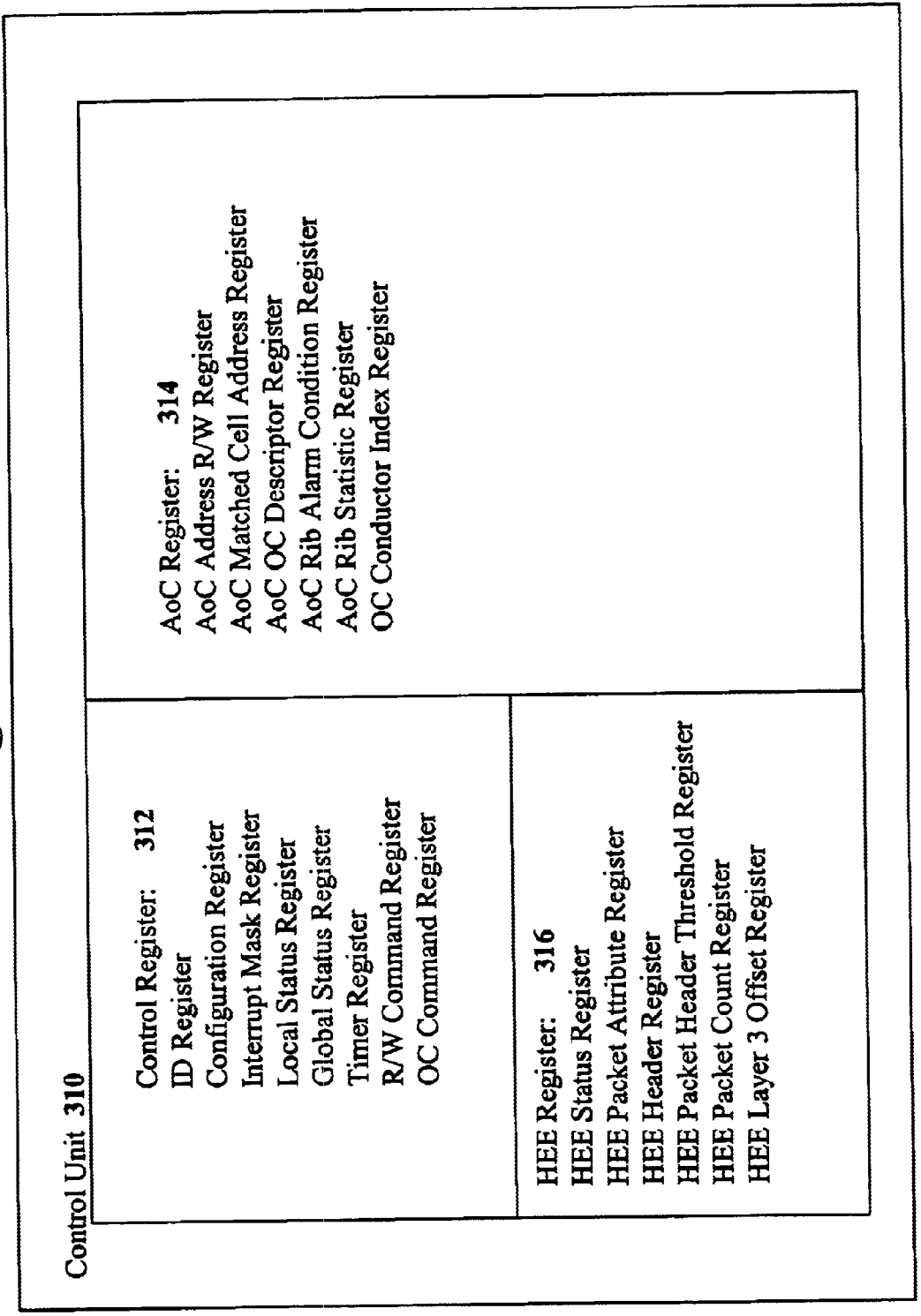

Control Unit 310

Control Register: 312
ID Register
Configuration Register
Interrupt Mask Register
Local Status Register
Global Status Register
Timer Register
R/W Command Register
OC Command Register AoC Register: 314
AoC Address R/W Register
AoC Matched Cell Address Register
AoC OC Descriptor Register
AoC Rib Alarm Condition Register
AoC Rib Statistic Register
OC Conductor Index Register HEE Register: 316
HEE Status Register
HEE Packet Attribute Register
HEE Header Register
HEE Packet Header Threshold Register
HEE Packet Count Register
HEE Layer 3 Offset Register

Operation Cword

| OC Descriptor Index (6 bit) | Starting PIE ID (4 bit) | Ending PIE ID (4 bit) | Branch Condition (4 bit) | Opcode-M (4 bit) | Branch Offset (3 bit) | Connection Cword Validity (1) | Increment Byte Count (1 bit) | Update Timestamp (1 bit) | Branch Address (17 bit) | Results Field (15 bit) |
|---|---|---|---|---|---|---|---|---|---|---|

*Fig. 5c*

PARALLEL STRING PATTERN SEARCHES IN RESPECTIVE ONES OF ARRAY OF NANOCOMPUTERS

CROSS-REFERENCE TO RELATED APPLICATION

This application is a continuation-in-part of pending U.S. application Ser. No. 09/305,783 filed Apr. 30, 1999, entitled "Control System for High Speed Rule Processors", which is continuation-in-part of abandoned U.S. patent application Ser. No. 09/224,382 filed Dec. 31, 1998, which are hereby incorporated by reference for all purposes.

FIELD OF THE INVENTION

The present invention relates to the field of pattern matching and searching. In particular the present invention discloses a parallel pattern searching system that allows one or more pattern to be located within a particular data stream.

BACKGROUND OF THE INVENTION

The Internet is a worldwide interconnection of computer networks that share a common set of well-defined data communication protocols. Specifically, most computer networks are coupled to the Internet communicate using the Transport Control Protocol (TCP) and the Internet Protocol (IP) commonly known as TCP/IP. These protocols provide a data connection between any two computing devices on the Internet. The TCP/IP protocols work in conjunction with higher-level network protocols including HyperText Transfer Protocol (HTTP) File Transfer Protocol (FTP), Network News Transmission Protocol (NNTP), Simple Mail Transport Protocol, and other application protocols to provide useful Internet services.

There is no central controlling authority in the global Internet. Individual entities coupled to the Internet are responsible for their own interactions with the Internet. To protect private networks, most private networks use a gateway that carefully controls the flow of traffic between the private network and the Internet. Examples of such gateways include firewalls and packet filtering routers.

Firewalls and packet filtering routers attempt to prevent unauthorized access by carefully examining each packet and properly routing (or dropping) each packet depending on the packet's characteristics. Most firewalls and packet filtering routers are implemented using a set of packet filtering rules. Each packet-filtering rule specifies a particular packet filtering policy. For example, all packets incoming from the Internet addressed to vulnerable server ports may be discarded in order to protect the internal servers on the local area network.

Packet filtering is normally performed on packet headers. Specifically, the Transport Control Protocol (TCP) and the Internet Protocol (IP) add a set of headers to each packet that most packet filtering routers examine to determine how to route the packet. However, it would be desirable to have even more precise methods of filtering packets.

SUMMARY OF THE INVENTION

In view of the above, it is one of the objects in the present invention to provide a system that provides even greater flexibility for packet filtering in a gateway system. The present invention provides such functionality by providing a high-speed parallel string searching system, that allows the body of a data packet to be searched for one or more patterns such as a string or a series of strings. These strings can be defined by the grammar of regular expressions. Specifically, one or more patterns are loaded into one or more nanocomputers and then the packet body is fed to the participating nanocomputers such that each participating nanocomputer tests for a match. The various tests performed by the nanocomputers may be combined to perform complex searches. These searches are performed in parallel. Furthermore, several different searches may be combined together using control statements. A combination of these searches engines can be supported such that data is also looked at in parallel. This above search mechanism is called "Deep Packet Search"

Objects and advantages together with the foregoing are attained in the exercise of the invention in the following description, resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2b illustrates the format of a packet from the Transport Control Protocol layer.

FIG. 3c shows a control unit that controls the operations of a PIE and array of cells (AoC) therein.

FIG. 5c illustrates the format of the Operation Cycle (OC) Command Word.

DETAILED DESCRIPTION OF THE PREFERRED EMBODIMENT

A parallel pattern searching system which can support regular expressions is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to a packet filtering application. However, the same parallel pattern searching system can easily be used in other applications such as general-purpose database search systems, objectionable material filters, and Internet search engines.

An Internet Gateway Application

Figure 1:
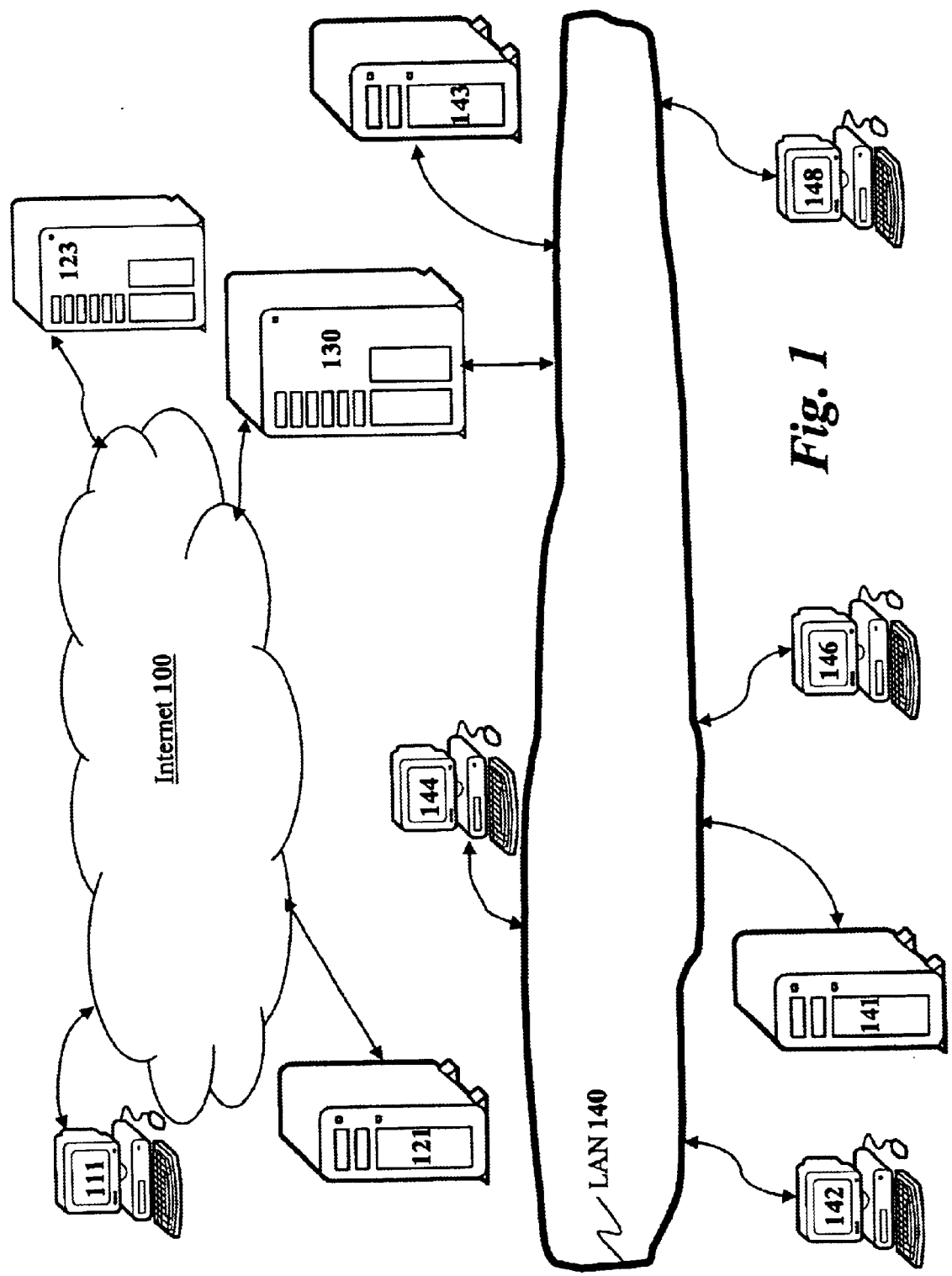
FIG. 1 illustrates a typical small local area network (LAN) coupled to the Internet through an Internet gateway device that performs a variety of packet processing tasks for data packets that travel between a local network and the Internet.

FIG. 1 illustrates one possible network application of the high-speed parallel pattern searching system of the present invention. Specifically, FIG. 1 illustrates a local area network (LAN) 140 coupled to the global Internet 100 with an Internet gateway device 130 that performs packet processing.

Referring to FIG. 1, the local area network (LAN) 140 is illustrated with a set of computer workstations 142, 144, 146, and 148 coupled thereto. The local area network (LAN) 140 environment also includes a couple of servers 141 and 143. If the servers 141 and 143 are only used for internal purposes then the internal servers 141 and 143 should only be accessible by internal clients such as computer workstations 142, 144, 146, and 148.

All communication between computer systems on the internal local area network 140 and the global Internet 100 passes through the Internet gateway 130. The Internet gateway 130 may provide a number of packet processing features. A few packet processing features relevant to the present invention include firewall protection, packet routing, and load balancing tasks.

Firewall Protection

Firewall protection provides network security. To prevent unauthorized access, the Internet gateway 130 processes packets with a set of firewall security rules that screen out packets related to unauthorized actions. For example, if the servers 141 and 143 are only to be used for internal purposes then the Internet gateway 130 should screen out all packets originating from the global Internet 100 and destined for the internal servers 141 and 143.

Firewall policies are typically implemented using a list of firewall rules. Each rule specifies a set of conditions to be matched and an associated action. If the conditions in a rule are met then the associated rule action is performed. For most firewall rules, the action specifies if the packet should be dropped or forwarded.

The set of conditions, in each rule varies significantly. Some rules only examine a few packet fields and other rules examine a number of different packet fields. Some rules are only activated upon exact matches and other rules require more complex comparisons such as less-than, greater-than, determining if a values is in a set defined by a particular value and mask, etc.

Packet Routing

Packet routing is performed to determine a path to be taken by a packet on a computer network such as the Internet. For example, Internet Gateway 130 may look at the destination address of a particular data packet and make a decision for the next hop address of the packet. Typically routing is performed by a lookup into a large routing table that contains a number of routing rules.

Load Balancing

Load balancing is the task of selecting a least utilized resource such that a "load" is balanced among all the available resources. One method of performing load balancing is to maintain a set of load values for each available resource. When a load balanced resource is required, the resource having the minimum load value is selected. The load value for the selected resource is then updated.

An Integrated Gateway

Figure 2A:
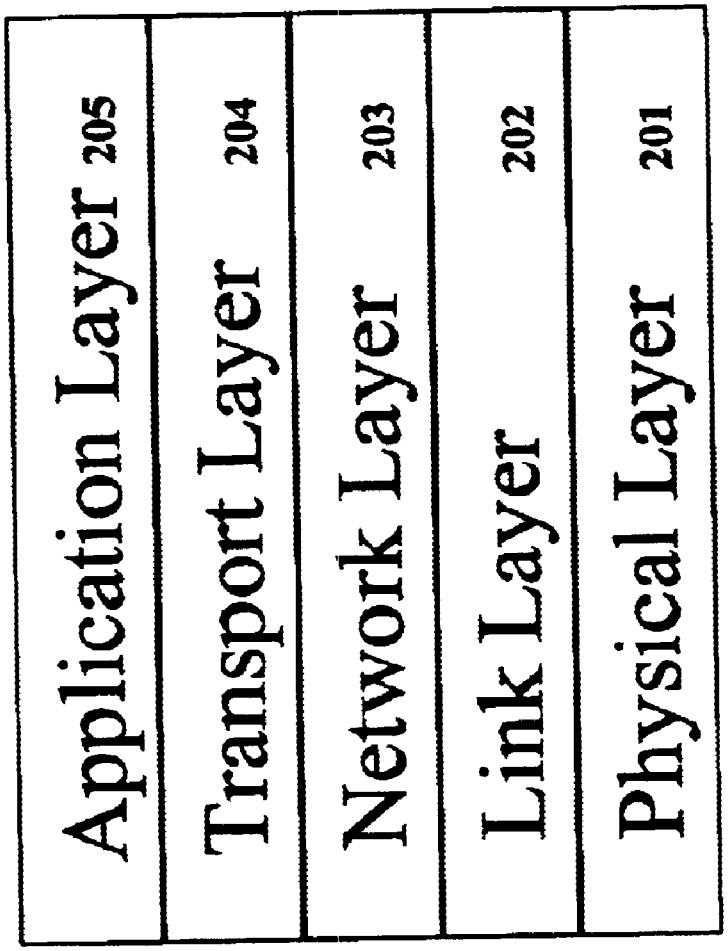
FIG. 2a illustrates the protocol stack for Internet data communication.

To perform the firewall protection, packet routing, and/or load balancing tasks, the network gateway 130 of FIG. 1 must examine a number of different packet aspects. FIG. 2a illustrates a simplified view of the Internet protocol stack. Referring to FIG. 2a, the lowest level is a physical layer 201 that comprises the hardware used to carry packets. The next later is a link layer 202 that provides a link between two points. In many local area networks, the link layer 202 is provided with the IEEE 802.3 Ethernet protocol. On top of the link layer is the network layer 203 that routes packets within a multi-point linked network. Internet applications use the Internet Protocol (IP) for the network layer 204. The network is The next layer is a transport protocol layer 204 that provides reliable transport between two points. For most Internet applications, the Transport Control Protocol (TCP) is used for the transport protocol layer 204. User Datagram Protocol (UDP) is another transport protocol commonly used on the global Internet. Finally, an application protocol 205 resides on top of the transport layer. As previously set forth, numerous different application layer protocols are used on the Internet including the HyperText Transfer Protocol (HTTP) for the World-Wide Web (WWW), the File Transfer Protocol (FTP) for file transfers, the Network News Transmission Protocol (NNTP) for USENET news distribution, and the Simple Mail Transport Protocol for email delivery.

For an Internet based packet filtering application, many of the most interesting packet aspects to examine are in the Transport Control Protocol (TCP) packet header (or a UDP packet header) and the Internet Protocol (IP) packet header. In normal Internet usage, TCP packets are enclosed within IP packets.

FIG. 2b illustrates the format of a Transport Control Protocol (TCP) packet. The objective of the Transport Control Protocol layer is to ensure a reliable connection between two computer nodes. Of particular interest to packet filtering applications are the source TCP port 210 and the destination TCP port 220. In some applications, a packet-filtering device may examine the flags 230 in the TCP packet header.

Figure 2C:
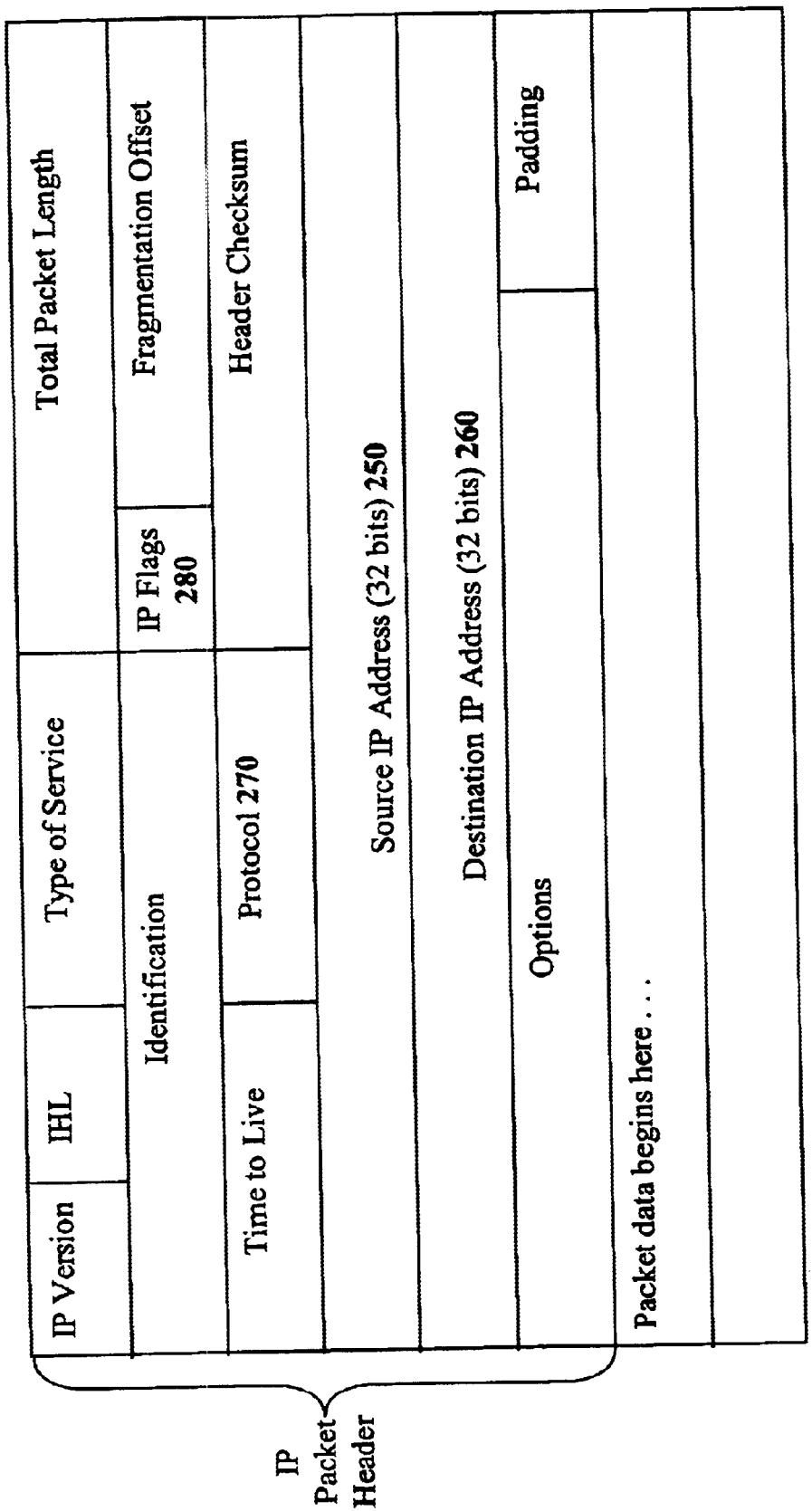
FIG. 2c illustrates the format of a packet from the Internet Protocol layer.

The TCP packet is typically enclosed within an Internet Protocol packet. FIG. 2c illustrates an Internet Protocol (IP) packet header. The objective of the Internet Protocol layer is to ensure that an Internet packet is properly routed from a source node having a source Internet Protocol (IP) address 250 to a destination node having a destination Internet Protocol (IP) address 260. Packet filtering devices typically process packets by examining the source Internet Protocol (IP) address 250 and the destination Internet Protocol (IP) address 260. Another important aspect that may be examined is the Protocol 270 field in the IP packet header. The Protocol 270 field specifies the type of protocol being used to transport the packet. If a TCP packet is enclosed, then the Protocol will specify the particular type of TCP protocol packet enclosed.

Although a number of existing of packet processing systems currently use the fields from the TCP and IP headers, there are many upcoming packet-processing applications that would significantly benefit from the ability to examine other areas of Internet packets. Specifically, it would be very advantageous to be able to process packets based up on information in higher-level protocol areas. For example, FIG. 2a illustrates an application protocol layer 205 that carries application specific information. Current usage reports of the global Internet indicate that a very large amount of Internet traffic uses the HyperText Transfer Protocol (HTTP) for the World-Wide Web (WWW). WWW based Internet traffic is so heavy that most popular WWW sites create many clones of the same WWW site and distribute WWW traffic among the many WWW site clones. This technique is known as "load balancing" as described above. One specific load balancing for the WWW is to use high performance servers to store and deliver bandwidth intensive multimedia information. In such an environment, it would be desirable to examine the contents of the HTTP headers and direct requests for multi-media information to such high-performance multi-media servers.

To allow such higher-level protocol examination and decision making, the present invention introduces a high-speed parallel pattern search system that allows a system to search for a particular pattern anywhere within a packet. This system will thus allow a routing system to search for specific patterns within higher level protocols such as HTTP.

The Packet Inspector Engine (PIE) Architecture

To perform pattern matching on any location within a packet at high-speed, the present invention uses a parallel processor architecture on a single integrated circuit (IC) device known as the Packet Inspector Engine (PIE). The Packet Inspector Engine includes an internal compare block known as an Array of Cells (AoC) that is used to perform parallel comparisons. Additional information on other Packet Inspector Engine features can be found in the U.S. patent application having Ser. No. 09/280,235 entitled "Method and Apparatus for High Speed Network Rule Processing" filed on Mar. 29, 1999 and the U.S. patent application having Ser. No. 09/305,783 entitled "Control System for High-Speed Rule Processors" filed on Apr. 30, 1999 which are both hereby incorporated by reference. Although the pattern searching system of the present invention is disclosed within a Packet Inspector Engine for use in a TCP/IP based packet filtering application, the concepts used to implement the pattern searching system may be used in many other integrated circuits used for other applications that require fast pattern matching.

Figure 3A:
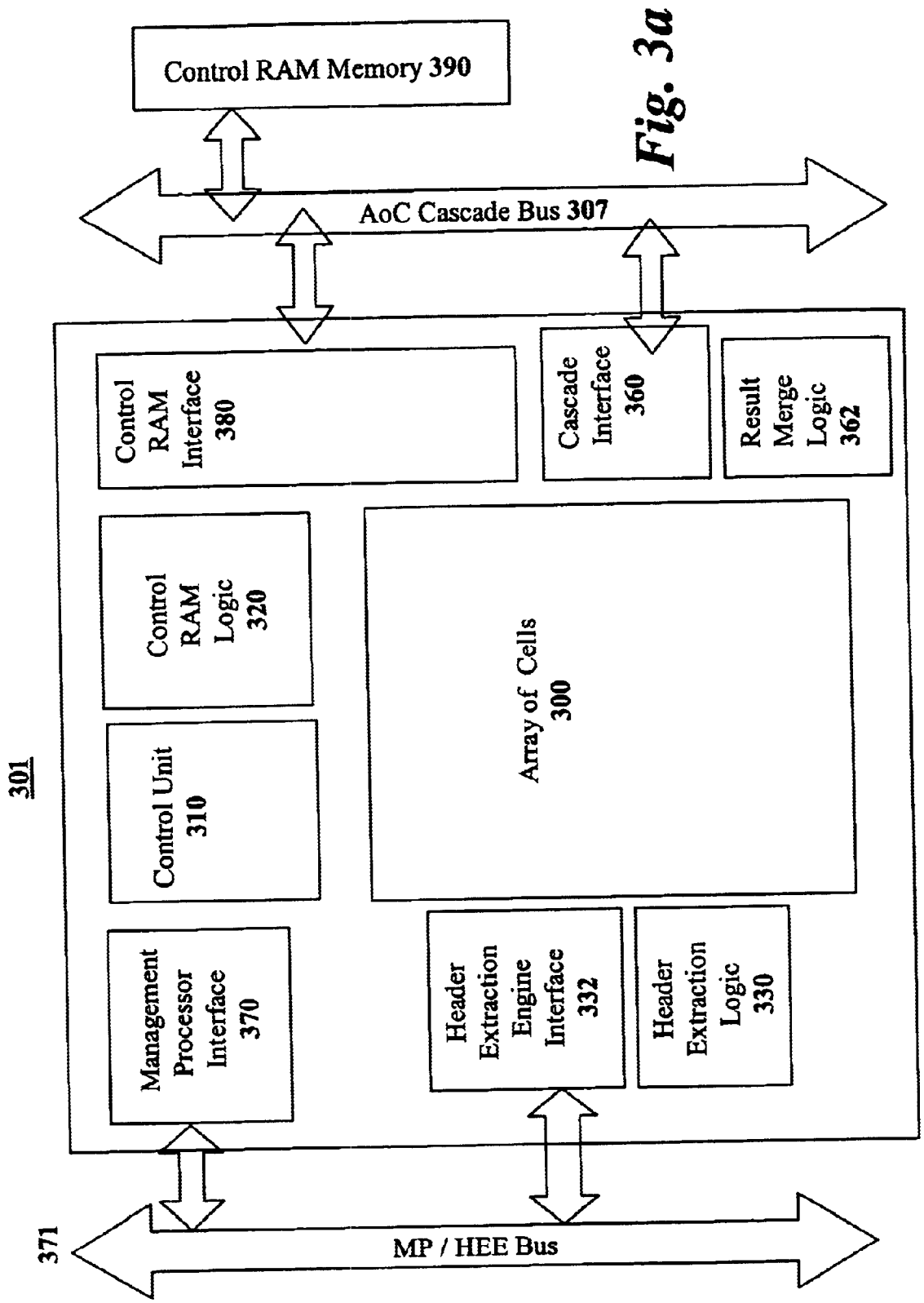
FIG. 3a illustrates the overall block diagram and the general architecture of the Packet Inspector Engine (PIE) in which the present invention may be practiced.

FIG. 3a illustrates an architectural block diagram of one embodiment of a Packet Inspector Engine (PIE) 301 in which the pattern matching system may be practiced. The PIE 301 comprises four primary interfaces; HEE Interface 332, MPI interface 370, Control RAM Interface 380 and cascade Interface 360 in addition to an array of Cells (AoC) 300, a control unit 310, a control RAM logic 320 and a header extraction logic 330.

As illustrated, HEE Interface 332 and MPI Interface 370 share a common data bus 371. The HEE Interface 332 is responsible for facilitating relevant packet information to be forwarded to AoC 300 for processing. In particular, HEE Interface 332 accepts packet attributes from the port processor 294 and the MPI Interface 370 reads and writes to/from various registers in PIE 301 through the same bus 371. Typically, HEE Interface 332 has the following signals that interface with the port processor 294:

1. Data input (packet information);
2. HEE Buffer Available (HBA) output;
3. Data Valid (DV) input; and
4. End of packet (EOP) input.
5. Byte Enable Lines (BE)

The data format for the data input is typically in 64 or 32 bits and programmable through a control signal. Unless otherwise specified, the following description is based on the 64 bits format. The HBA output, when active, indicates that HEE Interface 332 is ready for the packet information of a new packet. The Data Valid (DV) input is a validity signal that the HEE Interface 332 uses to load packet information into an internal buffer thereof, synchronously at each clock edge. The EOP input signal, when active, indicates that the packet data have been loaded into HEE Interface 332. With HBA signal and (EOP) signals, HEE Interface 332 is provided a better control as to when to stop and start receiving any new packet data.

Optionally, HEE Interface 332 includes two threshold registers that are used to specify limits regarding the amount of data that the HEE can accommodate. The first register sets the threshold for the end of a packet header and the second register sets the threshold for the maximum amount of packet data that HEE Interface 332 can read in. The packet data is clocked into the HEE Interface synchronously.

Figure 3B:
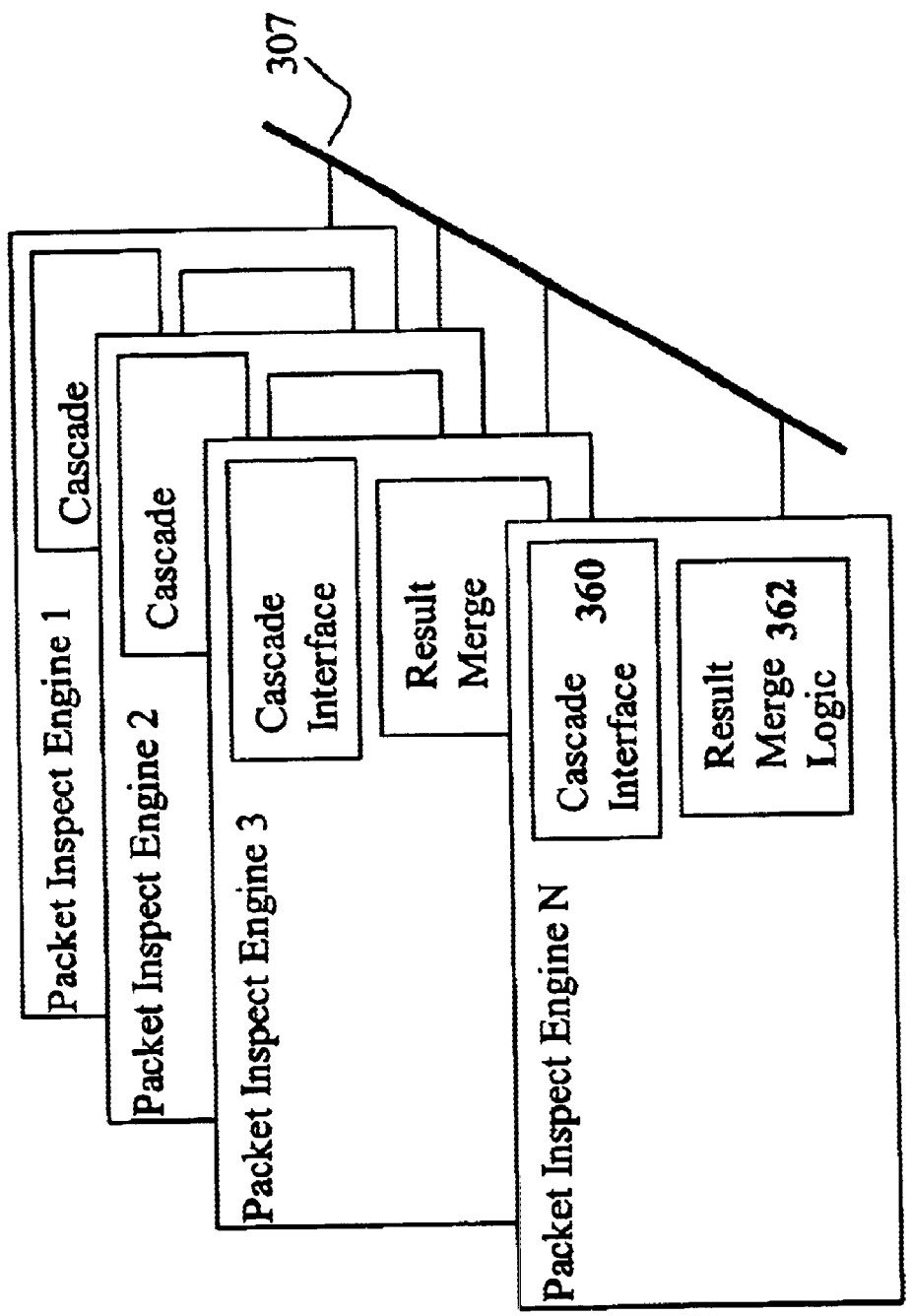
FIG. 3b demonstrates the parallel operation of multiple packet inspector engines configured in cascade mode.

MPI (Management Processor Interface) 370 is used to read and write to/from various registers in PIE 301 through the bus 371. To enhance the performance and increase signal throughput of the gateway, multiple Packet Inspector Engines (PIES) are preferably used and typically arranged in a cascade manner and operated in parallel as illustrated in FIG. 3b. Rules and parameters determining the fate of a packet are distributed among the Packet Inspector Engines (PIEs). In other words, each PIE processes the packet information independently with regard to the rules and parameters allocated thereto. The decision regarding the packet is kept in Result Merge Logic 362 of each of the PIES and subsequently collected through the MPI 370 to Result Merge Logic 362 in a master PIE. The detailed description on the processing of packet information in the array of cells (AoC) 300 as will as the operation of consolidating respective packet decision will be provided below.

Similar to the HEE Interface 332 and MPI Interface 370, the Control RAM Interface 380 and Cascade Interface 360 share a common data bus "CRAM-Casc_Data_Bus" or simply Cascade bus 307. The cascade interface 360 is used to manage the operations of the multiple Packet Inspector Engines (PIEs) that communicate through the Cascade bus 307. The actual control words (CWords) for executing an operation cycle (OC) are stored in the control RAM (CRAM) memory 390 and accessed through the Cascade bus 307 as well. Further, the control RAM memory 390 contains information for identifying and sequencing of the CWords, connection related information for performing NAT operations and aging operations, statistic information, etc.

Header Extraction Engine

The Header Extraction Engine (HEE) 330 is the first stage of processing for all packet classification operations in the PIE. When an external packet source sends packet data to the PIE, the packet is first buffered in the HEE. The HEE may extract the relevant data or header information for the packet and subsequently serves the extracted data the AoC 300 for rule processing. The HEE 330 may also stream any information from a packet to the AoC 300 when given an offset value. Furthermore, the streaming of information may occur in a forward or reverse direction such that the contents of a packet may be examined by starting at the back of the packet. In case of a reverse search the HEE will swap the data received in the HEE packet buffer.

The HEE 330 buffers upto 4 Kbytes of data per packet in multiple packet buffers. Once one HEE packet buffer is full, the relevant packet data is served to the Array of Cells (AoC). Meanwhile, another buffer can be filled by the external packet source.

Having multiple buffers allows the processor to send a third packet while the chip processes a second packet with the first packet being used for running lookups within the chip. If all the internal buffers happen to get full simultaneously, then the HEE will keep the HBA signal de-asserted.

A 64-bit field known as the Packet Information (PI) field may precede every packet that is sent to the PIE 301 over the system bus. The Packet Information (PI) field contains information that describes the following packet. Types of packet information that may be delivered include Layer 2 Type, Layer 3 Offset, direction (forward or reverse), an enable extraction bit, Operating Cycle identifiers, and user-defined Packet Attributes.

Based on information in the Packet Information (PI) field, the HEE 330 performs extraction of IP, TCP, and UDP packet header information from within the packet. The HEE 330 stores the extracted packet information in the 108-bit HEE packet header (HPH) Register. In one embodiment, the HEE 330 is designed to understand Ethernet at Layer 2, IP at layer 3 and TCP/UDP at layer 4. Within the Ethernet layer, the HEE 330 understands Ethernet II, Ethernet 802.3 and Ethernet 802.1 p/q.

The HEE 330 also has the capability of selecting an arbitrary number of bytes starting at a byte boundary anywhere within an HEE packet buffer and streaming this data into the AoC. This is used for searching for specific patterns within a packet.

The HEE 330 also contains a 52-bit HEE Packet Attribute (HPA) register that is filled with the packet attribute field or can be written to by the external processor. Based on a field in the OC Descriptor, the HEE 330 can be instructed to serve the AoC with data from either one of the above three sources—HPH, HPD, or HPA. The HEE 330 performs extraction of header fields in parallel after receiving data into its buffers. In order for the HEE 330 to start extraction of information on a packet, the HEE 330 uses the information of the PI field in the following manner:

HEE Processing

The HEE 330 first needs to be informed of the type of packet. Normally, an Ethernet packet is specified the packet type bits in the packet information (PI) field. If the packet is not an Ethernet packet, then the HEE 330 needs to be told the offset within the packet at which the layer 3 IP header starts. Furthermore, the HEE 330 needs to be told whether header extraction should be enabled or not by setting the extraction enable bit in the packet information (PI) field.

Figure 3D:
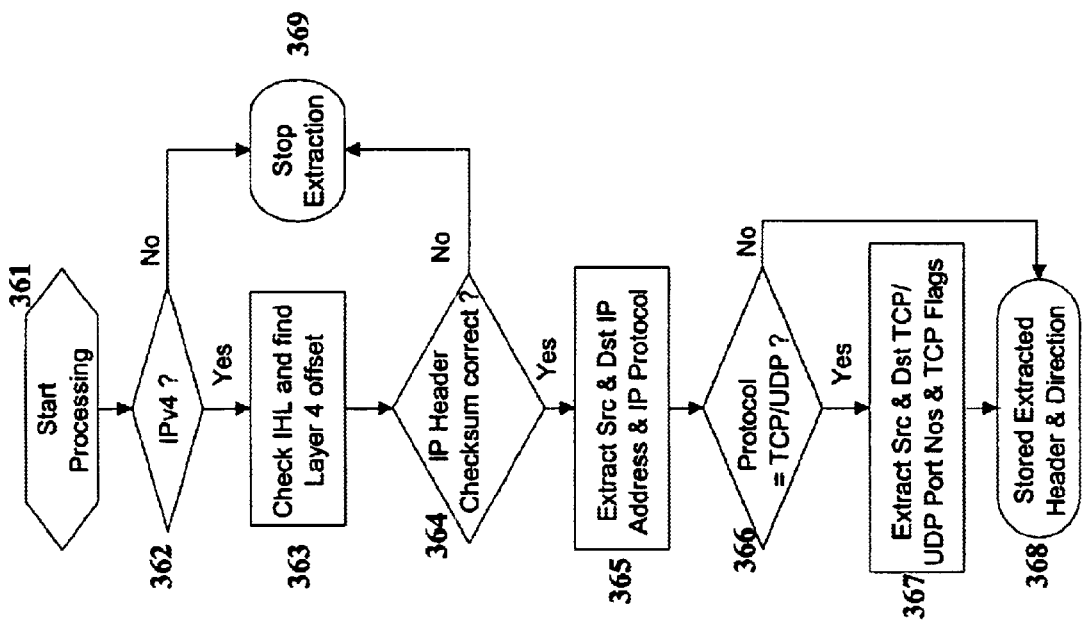
FIG. 3d shows the flow of operations within the Header Extraction Engine.

FIG. 3d illustrates the flow of a packet in the HEE 330. The HEE 330 begins by looking into the packet at step 361. At step 362, the HEE determines if the packet is an IPv4 type packet. If the packet is not an Ipv4 packet then the HEE stops the extraction process at step 369. If the HEE determines that the packet is an IPv4 type packet at step 362, then the HEE 330 processes the Ipv4 type packet at step 363. In one embodiment, the HEE processes the IPv4 type packet by checking the header length of the IP packet, finds the layer 4 offset, and determining an IP header checksum at step 363. If the checksum is incorrect then the HEE 330 stops the extraction process at step 369.

Next, at step 365, the HEE 330 extracts the source IP address and destination IP address of the packet. After extracting the source and destination IP address of the packet, the HEE 330 determines if the packet is using TCP or UDP as a transport layer protocol at step 366. If the transport protocol is neither TCP nor UDP then the HEE stores the extracted data at step 368. If the protocol is TCP or UDP, then the HEE extracts the port numbers at step 367. Then at step 368, the IP information and the TCP/UDP information are stored.

Cascade Interface

The PIE's can be cascaded in order to increase the number of rules supported. In one embodiment up to sixteen Packet Inspector Engines (PIEs) can be cascaded such that one of the PIE's is configured as the master and the remaining are configured as slaves. The cascade logic operations can be broadly classified into Full Operation Cycles (Full OC) and Partial Operation Cycles (Partial OC). A full operation cycle (Full OC) runs comparisons with all the applicable rules and returns a final result. Partial Operation Cycles (Partial OC) run until a first match has been detected.

Figure 3E:
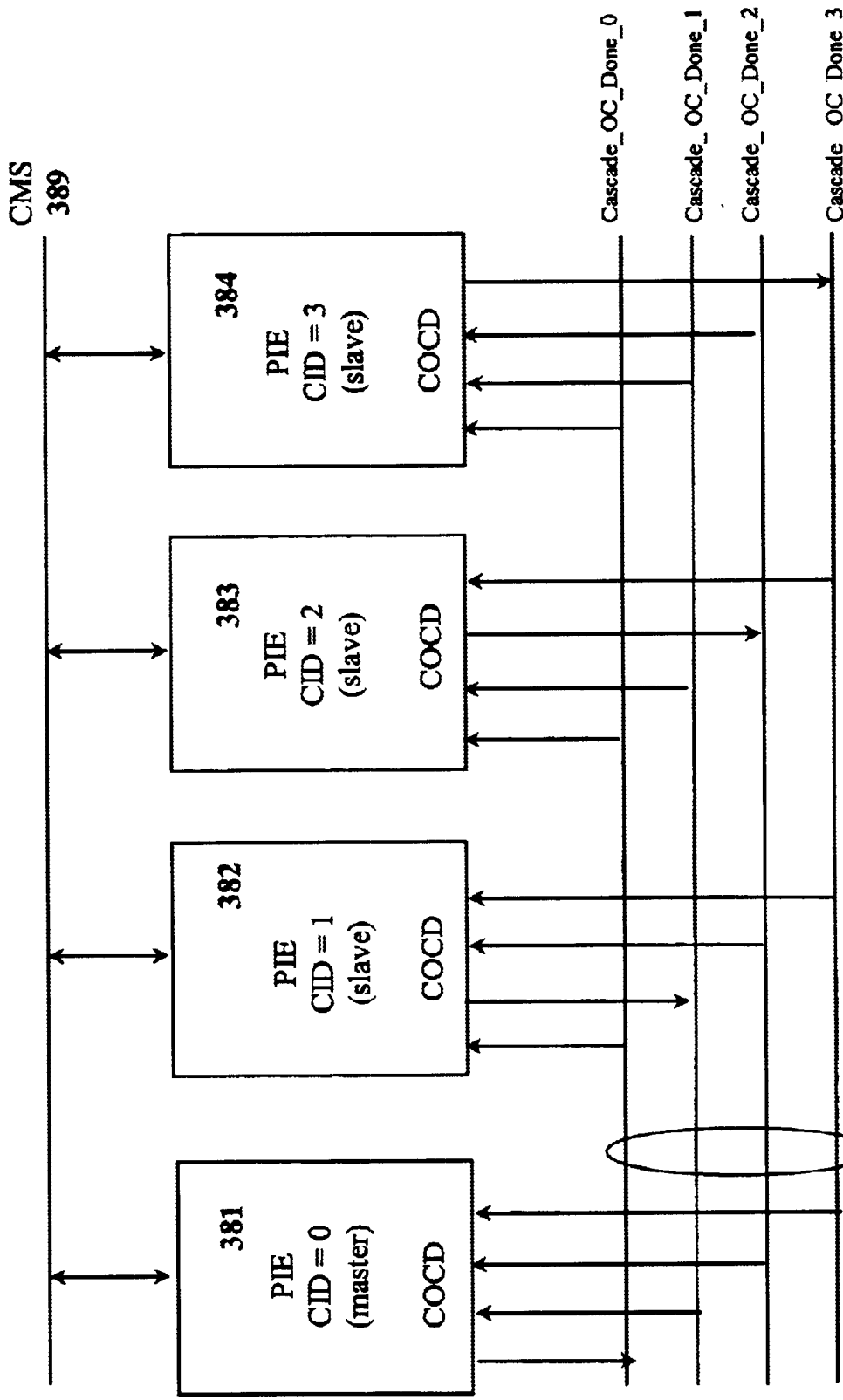
FIG. 3e further illustrates the cascade interface signals when the multiple packet inspection engines are configured in parallel.

FIG. 3e illustrates one embodiment of four Packet Inspector Engines (PIEs) in a cascade arrangement. (In another embodiment, eight PIE chips may be cascaded together.) As illustrated in FIG. 3e, each Packet Inspector Engine (PIE) is assigned a Cascade Identifier (CID) value. The CID value in each of the PIE chips indicated its priority on the cascade bus 307. The master PIE chip 381 with CID=0 has the highest priority. The priorities decrease with increasing CID numbers.

In an embodiment where up to four PIE's can be cascaded, there are four Cascade Operating Cycle Done (COCD) pins and one CMS pin for each PIE on the cascade interface. The COCD pins can be configured as input or output. Exactly one COCD pin identified by PIE's identifier value acts as output and the remaining pins act as inputs. The identifier value of a PIE is a unique value given to that PIE with respect to other PIE's.

FIG. 3e shows an embodiment where four PIE's are cascaded in parallel. The COCD pins 381, 382, 383 and 384 having output direction drives the correspondingly numbered COCD pins for the other PIE chips in the Cascade. Thus, each PIE receives the COCD status of all the other PIE chips.

Referring to FIG. 3e, the Cascade Match Signal (CMS) 389 is common to all the PIE chips. Each PIE chip drives this signal only when it receives COCD status from all the lower priority PIE chips. Thus, there is no contention on the Cascade Match Signal (CMS) 389 line.

Partial OC Description

The master PIE 381 drives the Cascade Operating Cycle Done (COCD) pin to initiate the Operating Cycle (OC). All the participating slave PIE chips 382, 383, and 384 de-assert their Cascade Match Signal (CMS) signals 389 and their Cascade Operating Cycle Done (COCD) status signals and begin applying their respective rules simultaneously. All the non-participating PIE chips assert their Cascade Operating Cycle Done (COCD) status signal and de-assert their Cascade Match Signal (CMS) 389.

The slave PIE chips that have completed the application of all the rules without hitting the match will assert their corresponding Cascade Operating Cycle Done (COCD) signals. The participating PIE chips that hit a match and have not received Cascade Operating Cycle Done (COCD) status assertion signal from all the higher priority PIE chips will suspend the current operating cycle (OC). Such PIE chips wait for all the higher priority PIE chips to complete their operating cycles (OCs).

The PIE chip that has found a match and has also received a Cascade Operating Cycle Done (COCD) status from all the higher priority PIE chips asserts its Cascade Match Signal (CMS) 389. That PIE chip then transfer the results to the master PIE 381. Once the present match is serviced, the master PIE 381 may ask the cascade of the chips to continue the operating cycle (OC).

The Master PIE 381 may abort the OC at any time. In such an event, the PIE chips that have not completed their OCs abort the OC. Any PIE chips that have suspended and are waiting for all the higher priority PIE chips to assert the COCD status also abort their OCs. All the PIE chips get ready to read the next command from the master PIE 381 or from the packet source.

Since all the PIE chips receive the COCD status from all the other PIE chips, termination of the Partial OC takes place when all the PIE chips have completed their OCs.

Full OC Description

The Master PIE 381 drives the COCD pin to initiate the OC. All the participating PIE chips de-assert their Cascade Match Signal (CMS) signals 389 and their COCD signal and start applying their rules simultaneously. All the non-participating PIE chips signal their COCD status and de-assert their CMS signal 389.

The PIE chips that have completed the application of all the rules without hitting the match will assert their corresponding COCD signals. The participating PIE chips that have hit a match and have not received COCD assertion signal from all the higher priority PIE chips, register the match result and continue the OC. No further match results are registered since the first match is the highest priority match.

The PIE chip that has found a match and has also received COCD status from all the higher priority PIE chips, assert the CMS and transfer the results to the master PIE 389. This PIE continues the application of the rules and no further match results are registered. The statistic counter update continues for all the rules that have matched and Statistic Enable bit set.

If any of the PIE chips asserts the CMS signal, all the other PIE chips flush their results. Any PIE chip that has not completed the OC continues applying the rules and updating the statistic counter whenever required. Since all the PIE chips receive the COCD status from all the other PIE chips, termination of the Full OC takes place when all the PIE chips have completed their OCs.

The only difference between the Partial OC and the Full OC is whether the PIE chips continue the OC or discontinue the OC after the first match. In case of a Full OC, only one match result is obtained, whereas in the case of a Partial OC all the results can be obtained by continuing the Partial OC. The command to continue is given by the port processor and it can discontinue the Partial OC anytime.

Array Of Cells (AoC)

Figure 4A:
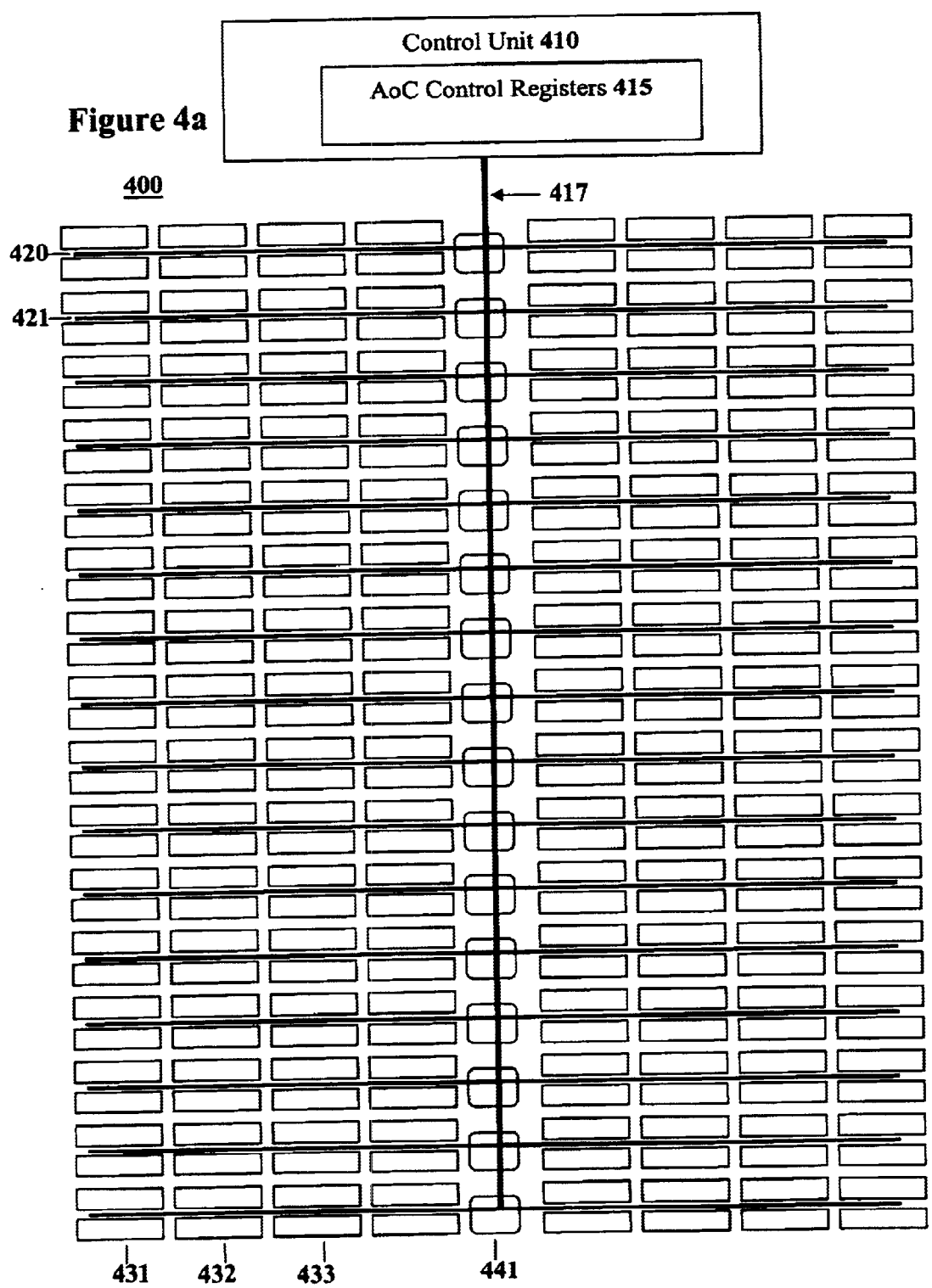
FIG. 4a illustrates one possible array arrangement of individual nanocomputers (i.e. AoC).

The Array of Cells 300 is a massive parallel processor (MPP) comprising individual nanocomputers. Each nanocomputer may contain several rules such that rules in the same nanocomputer operate successively instead of concurrently. FIG. 4a illustrates an exemplary implementation of an Array of Cells (AoC). As illustrated, AoC 400 operates under the control unit 410 that includes several control registers 415. The control unit 410 controls a large array of nanocomputer units (431, 432, 433, etc.) through a main packet distribution bus 417.

The main packet distribution bus 417 is coupled to a set of "rib busses" (420, 421, etc.) that couple the individual nanocomputer units (431, 432, 433, etc.). Each rib bus (420, 421, etc.) is controlled by a rib control unit such as 441. The rib control unit on each rib bus helps control the nanocomputer units on that rib bus. In the embodiment of FIG. 4a, there are sixteen (16) rib buses coupled to the main packet distribution bus 417 and sixteen (16) nanocomputer units coupled to each rib bus for a total of two hundred and fifty-six (256) nanocomputers in AoC 400.

Each nanocomputer unit (431, 432, 433, etc.) contains command and data information for processing a number of different rules. In one embodiment, each nanocomputer unit (431, 432, 433, etc.) contains information for thirty-two (32) different rules. Each of the command and data information units (rules) within each nanocomputer is known as a "cell", hence the name Array of Cells.

In the embodiment of FIG. 4a, The AoC 400 comprises sixteen nanocomputers on each of the sixteen rib buses and thirty-two rules in each nanocomputer. Such an embodiment can process eight thousand one hundred and ninety-two rules (16 * 16 * 32=8192 rules, i.e. 8K). When all the nanocomputers are being used for a single set of rules, all 8192 rules can be processed in a thirty-two-cycle period (one cycle for each cell within each nanocomputer).

The Serial AoC

In one embodiment, the Array of Cells 300 is implemented in a massively parallel manner wherein each nanocomputer is implemented with a serial register. The packet data flows into the rib blocks via the packet distribution bus 602. Serial registers within each nanocomputer on each rib block are initially loaded with data in a parallel manner till the registers are fully loaded. Further data is received byte by byte and shifted into the register in a serial manner via the rib bus. Each time the serial register receives new data, a processing cycle is performed. Each rule register 640 within the nanocomputer stores the rule that is to be matched and a bit mask associated with the rule. During this processing cycle, the nanocomputer masks the received bit with the associated bit mask present in the nanocomputer and compares it to the stored rule bit.

After the comparison, the next rule bits as well as the mask bits are taken from the Rule SRAM 620 and kept ready for compare. Simultaneously, the next set of pattern data bits are serially loaded into the serial registers. These serial registers may be constructed to contain any length of packet data and this length may be variable. In one embodiment, the serial register may occupy a single nanocomputer only or it may span across all the nanocomputers on a rib thereby achieving either a "short pattern search" or a "long pattern search" operation. The least significant bit (LSB) is moved to the place previously occupied by the most significant bit (MSB). In this embodiment the AOC cells support only an operand and a mask and do not support range compares.

Control Unit

Referring to FIGS. 3a and 3c in conjunction with FIG. 4a, the control unit 310 (410) primarily controls the operation of the PIE 301 and in particular the array of nanocomputer units (431, 432, 433, etc.) through a main packet distribution bus 417. According to one embodiment, the control unit 310 comprises a number of group registers; control registers 312, AoC registers 314 and HEE registers 316. Each of the group registers further comprises individual registers. Particularly, control registers 312 comprises the following registers:

ID Register: containing identity (ID) assigned to a PIE. The ID register for the master PIE is set to zero (ID=0). In addition, the ID register determines the starting address of the SRAM cells within the PIE, for example, the starting address=0 when ID=0, hence the starting address=8192 when ID=1 (assuming 8 K cells therein);

Configuration Register: containing control bits for the PIE, for example, Enable HEE, Enable Control Word Logic, and Enable Cascade, etc.

Interrupt Mask Register: specifying masks for various conditions that can causes the PIE to raise an external interrupt;

Local Status Register: containing bits respectively indicating status of functions in the PIE;

Global Status Register: containing bits respectively indicating status of functions of all PIEs participating together in an operation.

Timer Register: specifying an internal timer that increments every time unit;

R/W Command Register: containing commands issued to the AoC for read write to cell locations; for example: 00000 causes to read SRAM Cell, 00001 causes to write SRAM Cell OC Command Register: containing commands issued to the AoC for execution of operation cycles.

The AoC registers 314 are used to program the operation of the AoC and include:

AoC Address R/W Address Register: programmed to contain various kinds of addresses including cell addresses, AS Block address, Rib address, CWord address and OC Descriptor index;

AoC Matched Cell Address Register: storing the address of the highest priority matched cell after an operation cycle;

AoC Rib Alarm Condition Register: [also referred to as Alarm Condition rib Number Register] for storing the rib number of the highest priority cell that causes an alarm condition to be set;

AoC Rib Statistic Register: [also referred to as statistic rib Number Register] for storing the rib number of the highest priority cell that causes a statistic counter to increment;

OC Conductor Register: a 64-bit register to contain identifiers for OC descriptors that are used for running OCs without using Control RAM (CRAM). In particular, each identifier consists of 16 bits and the assignment of each bit is provided in detail below. Instead of identifiers, this register can also contain a control RAM address to decide which control RAM location to chose for running an OC.

HEE registers 316 are used to control the operations of Header Extraction Logic 332 and include a number of registers:

HEE Status Register: including bits for packet attributes ready and packet header ready;

HEE Packet Attribute Register: a register for storing packet attributes;

HEE Packet Header Register: a register for storing information regarding protocol and flag fields. This register is primarily used for supplying data needed for the main firewall OC;

HEE Packet Header Threshold Register: storing offset at which the packet header ends. In other words, HEE stores the packet information as header until this offset and the rest is the packet data. In addition, the offset serves as a threshold to start a second OC following the primary OC;

HEE Packet Count Register: identifying the amount of bytes the HEE should read from the packet and store internally, namely, the total number of bytes read by the HEE;

HEE Layer 3 Offset Register: containing an offset from which the layer 3 header starts within the packet received by the HEE.

Packet Attributes & OC Conductor (OC Descriptor Identifiers or Control RAM address)

Each packet has a number of associated attributes that are obtained to determine the manner of packet header extraction to run an operation cycle (OC).

Figure 5A:
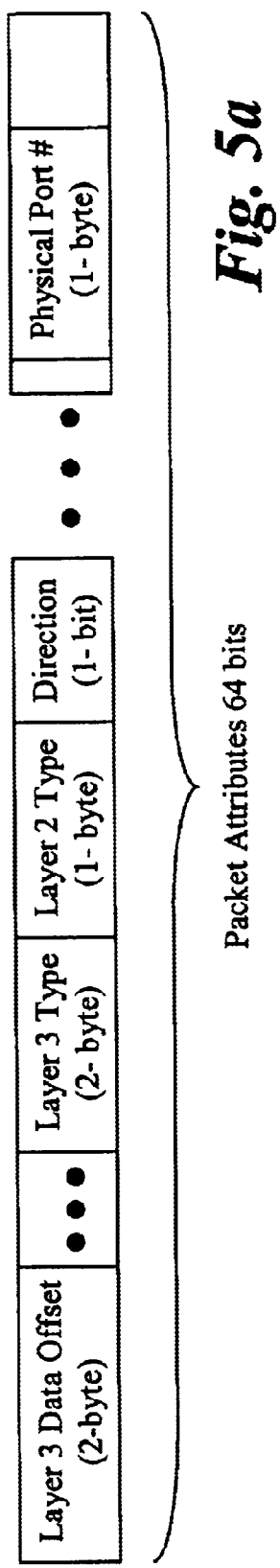
FIG. 5a illustrates an exemplary format of packet attributes (64 bits) received by the attribute register in a PIE.

Typically, the packet attributes are supplied to the HEE 330 in the first 64 bits as shown in FIG. 5a and comprises the following:

Layer 3 Offset (6 bits): These bits specify the offset within the packet where the Layer 3 IP Header starts.

Packet Type Bits (3 bits): These bits identify whether the packet is an Ethernet or some other layer 2 type. They also identify that if the packet is a nonEthernet packet, whether the HEE should look at the layer 3 offset value to find out where the IP header starts.

Direction (1 bit): This bit is an indicator of the direction in which the packet was received. A value of zero (0) means that packet was has come from a direction defined as "outside". A value of one (1) means that the packet was received from "inside".

Enable Extraction (1 bit): This bit indicates whether the header extraction of the HEE will be turned on or off.

OC Conductor Available (1 bit): This bit is used to find out the nature of the next 64 bits of data written to the HEE. If this bit is set, then the next 64 bits are assumed to be an OC conductor. Otherwise, the 64 bits are taken to be part of the actual packet data.

User defined attributes (52 bits): These bits are user defined and the HEE does not interpret them. They are written directly to an internal register called the HEE packet attribute register.

The packet attributes are stored in HEE Attribute Register of the HEE registers 316. According to the arrangement shown in FIG. 5a, the first six bits of the 64 bits are the Layer 3 Data offset that dictates how the HEE interprets packet data. In essence, the amount of time the HEE needs to extract information depending on this offset.

Figure 5B:
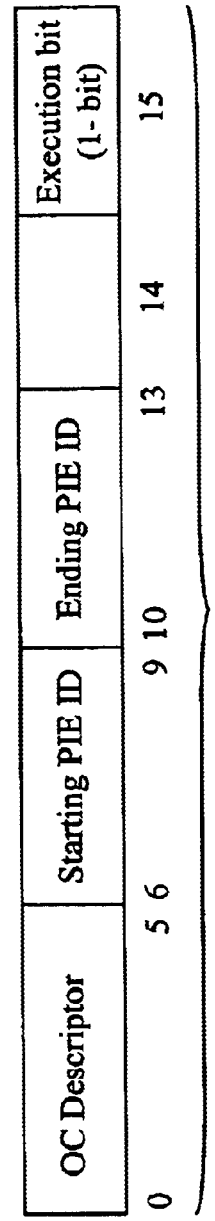
FIG. 5b illustrates an exemplary format of Operation Cycle (OC) Descriptor Indices (64 bits) received by the attribute register in a PIE.
Figure 5B:
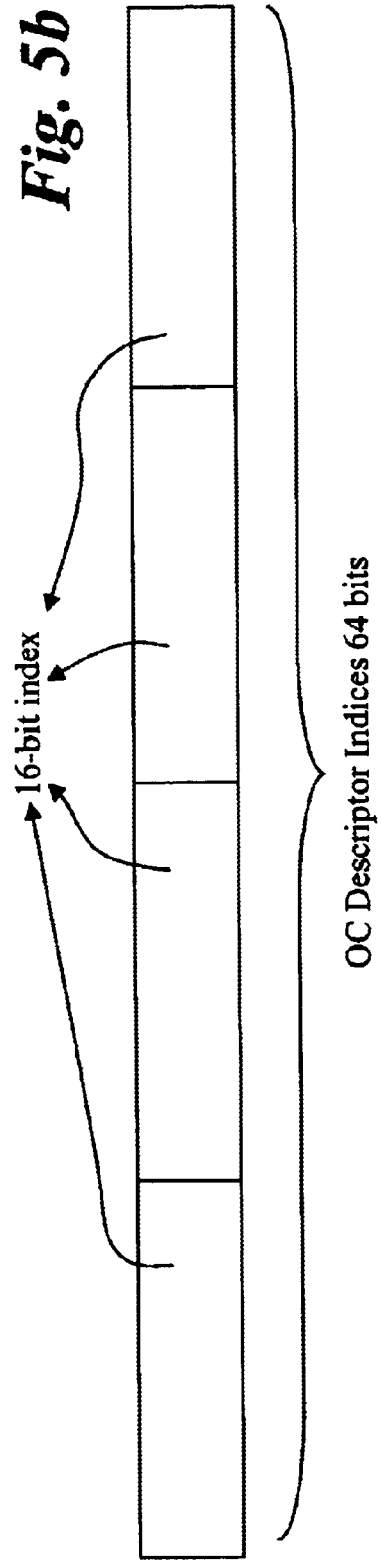

Following the packet attributes, the next 64 bits are the OC Conductor that contain either four OC Identifiers or a Control Word Address either of which is used by the PIE to run OCs on the arrived packet. The 64 bits formed in a group of 16 bits each are stored internally. The four OC Identifiers, each of which is 16 bits, are illustrated in FIG. 5b. The 16 bits are interpreted as follows:

OC Descriptor Index: These six bits are an OC Descriptor Index and specify the index of the descriptor in the OC Descriptor table that will be used for running the OC.

PIE Selectors: These eight bits specify which range of the eight PIEs in a cascade arrangement will participate in the operating cycle (OC).

Execution Bit: The Identifier is used to run an OC if this execution bit is set.

The HEE can automatically trigger the start of OC execution by the chip. Subsequently the OCs are then controlled either using control words in control RAM (CRAM) or by using the next identifier in the group of four OC identifiers as shown in FIG. 5b two OCs within a PIE.

In a particular embodiment, the HEE has hardcoded logic for doing header extraction for IP packets. It assumes that each packet is an IP packet and the header information extraction is performed according to the packet format illustrated in FIGS. 2a and 2b.

Control RAM

Referring back to FIG. 3a, Control RAM Interface 380 couples the PIE 301 to Control RAM (CRAM) 390 through cascade bus 307. The CRAM 390 stores control information (i.e. Control Words or CWords) used to control the Array of Cells engine 300. According to one embodiment, the CRAM 390 is a 32-bit RAM that is organized into 256K segments of 32-bit words. In a system with 16 cascaded Packet Inspector Engines wherein each Packet Inspector Engine has 8 K rules, there will be 128K rules. If each rule or cell needs one 64 bit CWords, that leads to segments having 128K of 64-bit CWords in each of these spaces. The segments identified in CRAM 390 is as follows:

Cell Operation CWord Segment: containing Operation CWords for each of the AoC cells, one 64 bit CWords per cell;

Non-Operation Cell C-Word Segment: containing operation CWords used by the PIE that may not be specific to the cells;

Data CWord Segment 0: containing information interpreted per cell, for example, Packet Counter (32 bit) and Byte Counter (32 bit);

Data CWord Segment 1: containing information interpreted per cell, for example, Timestamp (32 bit) and Rule State (8 bit); and User Segments: containing CWords that are not interpreted by the PIE.

In one embodiment, it is assumed that there are eight segments (four of the identified segments and four User Segments); with each segment having 128K CWords. The CWords are used for selecting and controlling an operating cycle (OC). The Operation CWords are accessed by both master and slave PIES for controlled operations.

FIG. 5c shows respectively the contents of a 64 bit Operation CWord. In one embodiment, the bits are allocated as follows:

OC Descriptor Index (6 bits): specifying what OC Descriptor to use in a PIE;

Starting PIE ID (4 bits): specifying the first one of the multiple PIES that are participating in the operating cycle (OC);

Ending PIE ID (4 bits): specifying the last one of the multiple PIES that are participating in the OC;

Branch Condition (4 bits): specifying branch condition that a PIE should execute;

Opcode-M (4 bits): specifying operations that are to be executed only by the master PIE;

Branch Offset: specifying the offset in case of a relative branch or a break condition;

Connection Cword Validity (1 bit): implying a valid Data/Connection CWord associated with this Operation CWord if it is set;

Increment Byte Count (1 bit): indicating the PIE to increment the Byte Counter field of the Connection CWord (only Connection CWord Validity is set); and Update Timestamp (1 bit): indicating to update the Timestamp field of the connection CWord (only Connection CWord Validity is set).

Brach Address: This specifies the absolute address to jump to in case of a branch or a break condition.

Results Field: This field is for user-defined results.

OC Descriptors

The OC Descriptors are preferably stored in the OC Command Register in the control a PIE and indexed using the OC Descriptor Index field in an Operation CWord stored in CRAM 390. The OC Descriptors identify a particular portion of the Array of Cells (AoC) in a PIE that should participate in an OC. The fields in the OC Descriptors are specified as follows:

Row Start Address: (five-bit) specifying the Cell row from which the OC should start;

Row End Address: (five-bit) specifying the Cell row at which the OC should end;

Rib Start Address: (four-bit) specifying the starting rib number;

Rib End Address: (four bit) specifying the ending rib number;

Opcode: (four bit) specifying the operation that should be executed by the PIE;

Data Source: (two-bit) specifying the date source for running the OC, for example:
  00—HEE Packet Attribute Register;
  01—HEE Packet Header Register;
  10—HEE Packet Data Register;
  11—AoC Data Register Set;

Data Search Starting Offset: (nine bit) specifying the offset in the packet from which the data search OC should start;

Number of Bytes to Search: (four bit) specifying the number of bytes of the packet to be searched.

Operation of AoC

Figure 6A:
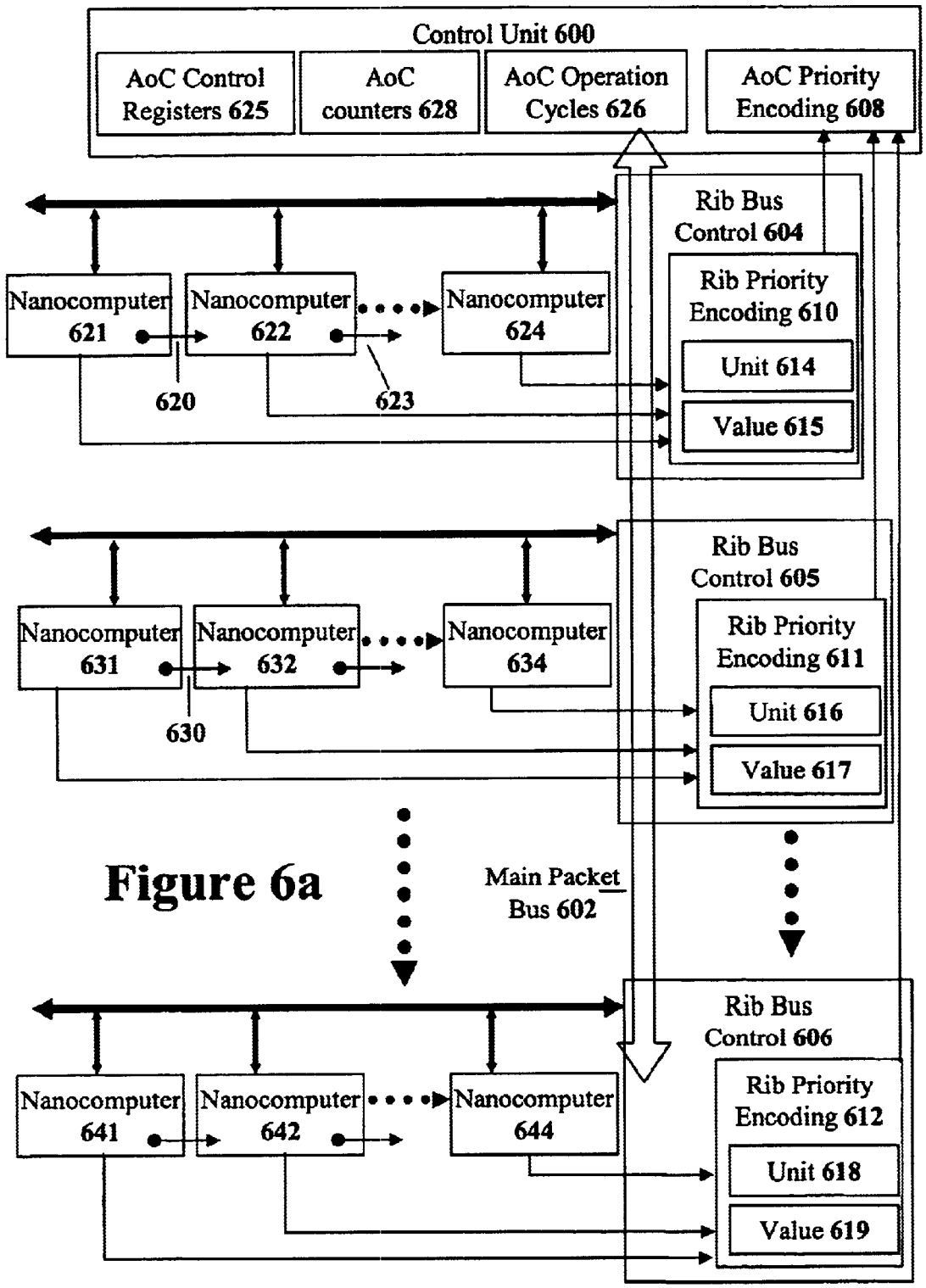
FIG. 6a shows a block diagram of one possible embodiment of an array of nanocomputers.

The pattern matching features of the present invention are implemented within the Array of Cells 400 depicted in FIG. 4a. To fully understand the present invention, it is deemed necessary to understand the operations of the Array of Cells 400. The control unit 410 exercises overall control of the Array of Cells 400 by downloading rule information into the individual cells within each nanocomputer through the main packet distribution bus 417. Each rib control unit on the main packet distribution bus 417 receives downloaded information and passes that information to the appropriate nanocomputers located on the rib control unit's associated rib bus. FIG. 6a presents a conceptual block diagram of the Array of Cells that provides additional detail. Each nanocomputer that receives downloaded information stores that information into the appropriate rule entries in the nanocomputer's memory.

The Array of Cells processes a data packet by sending the packet down the main packet distribution bus 602 along with command information that describes the type of operation that should be performed and a description of the nanocomputer cells that should participate in the processing. Each rib control unit (604, 605, ..., 606) on the main packet distribution bus 602 receives packet information and associated command information. Each rib control unit then passes that packet and command information to the appropriate nanocomputers located on the rib control unit's associated rib bus. Each selected nanocomputer then processes the packet information with the appropriate rules to generate results. All of the nanocomputer processing occurs in parallel such that an entire array of cells can concurrently process a single data packet.

Prioritization Logic

When the results of an Array of Cells operation are to be reported, the operation results are reported back to the control unit 600 using the inherent cell priority system. Specifically, each nanocomputer determines its highest priority cell result and reports to the local rib priority encoding logic in the local rib bus control unit. The local rib priority encoding logic selects the results from the highest priority report nanocomputer coupled the local rib bus and stores that result. Finally, an AoC priority encoding logic 608 in the main control unit 410 will retrieve the result from the highest priority rib bus control unit that reports.

To achieve this result, each rib priority encoding logic (610, 611 ..., 612) in each rib bus control unit (604, 605 ..., 606) determines the highest priority match among its '0 nanocomputers and maintains this nanocomputer unit's value and stores it in a register. (614, 616, ..., 618). Some operations may output a resultant value. To store the most significant resultant value from the nanocomputers on the local rib bus, each rib priority encoding logic (610, 611, ..., 612) further includes a value register (615, 617, ..., 619). The AoC priority encoding logic 608 in the main control unit 600 will read the various value registers (615, 617, ..., 619) to select the highest priority value.

The Nanocomputer (or AS-Block)

Each nanocomputer comprises a simple complete computer system. Specifically, each nanocomputer contains all the basic elements of a computer system including input & output circuitry, a memory unit (often a SRAM) for storing instructions (rules), several arithmetic logic units (ALUs), and a control circuit for reading and processing the instructions. Since the main features of one nanocomputer embodiment are the ALUs (for processing) and SRAM (for storing rule commands and data), the nanocomputer is also known as an ALU-SRAM block or AS-block.

The Nanocomputer (or AS Block) Architecture

Figure 6B:
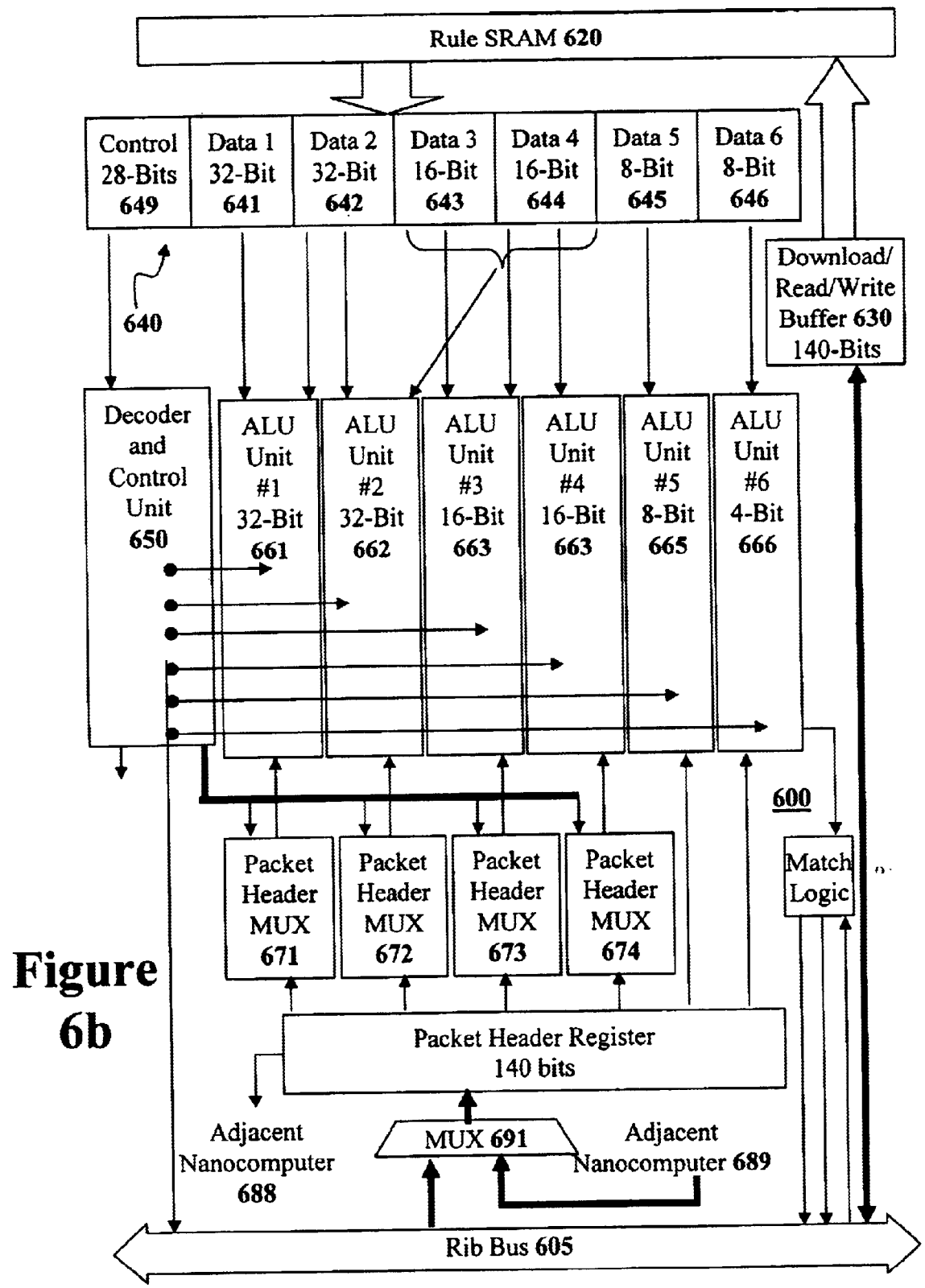
FIG. 6b illustrates one possible embodiment of an individual nanocomputer.

FIG. 6b illustrates a detailed block diagram of one possible embodiment of a nanocomputer 600. Referring to FIG. 6b, the nanocomputer receives input information and sends output information through a bus 605. The bus 605 is the rib bus to which the nanocomputer is coupled. The information received from the bus 605 may be passed to a download/read/write register 630. The download/read/write register 630 may temporarily store downloaded rule information before such information is stored into the random access memory (RAM) unit 620.

The random access memory (RAM) unit 620 stores the instruction and data information (rules) that will be processed. As previously stated, in one embodiment the random access memory (RAM) unit 620 contains thirty-two entries for storing rules. (Wherein each rule comprises both instruction and data information.) In the embodiment of FIG. 4a, each rule entry is one hundred and forty bits wide. However, nanocomputers can be constructed using different rule sizes. In one embodiment, the random access memory (RAM) unit 620 is constructed using static random access memory (SRAM) technology.

The rules in the random access memory (RAM) unit 620 are latched into a rule register 640. In the embodiment of FIG. 6b, the rule register 640 passes a twenty-eight-bit instruction word to a decoder and control unit 650 from the twenty-eight bit control portion 649. The remaining one hundred and twelve bits are split into six data fields 641, 642, 643, 644, 645, and 641. The data fields store the data information that is passed to the six different arithmetic and logic units (ALUs) 661 to 666. Again, it must be noted that the rule format disclosed in FIG. 6 and following figures represents only one possible rule format. Many different variations exist.

The nanocomputer's decoder and control unit 650 decodes the twenty-eight bit instruction and controls the operation of the six ALUs and the multiplexors that provide data to the ALU. The decoded instruction determines how the arithmetic logic units will process the data. Details on the format of the instructions will be disclosed in a later section.

The six different arithmetic and logic units (ALUs) 661 to 666 in the embodiment of FIG. 6b operate on the one hundred and twelve bits of data information from the rule retrieved from the rule RAM 620 and information retrieved off the bus 605. Under control of the decoder and control unit 650, the six arithmetic and logic units (ALUs) 661 to 666 perform comparison and arithmetic operations to produce a result.

In the embodiment of FIG. 6b, the first two ALUs 661 and 662 operate on thirty-two bit data units. In the normal Internet packet filtering application, the first two ALUs 661 and 662 operate on the source and destination Internet Protocol (IP) addresses retrieved from IP packet headers off the bus 605. However, these first two ALUs 661 and 662 may operate on other packet data fields or other data types in other applications. In such other applications, the proper data must be supplied to the packet inspector engine such that data appears on bus 605. Associated multiplexors 671 and 672 are then used to direct the proper data field from the bus 605 into ALUs 661 and 662.

In most operations, ALU 661 operates only on reference data from the data field 641 and packet data retrieved from the bus 605. However, in certain operations, such as masked operations, require three input values. For masked operations, the ALU 661 operates on reference data from the data field 641, packet data from the bus 605, and mask data from the adjacent data field 642. Similarly, ALU 662 normally operates on reference data from data field 642 and packet data from the bus 605, however ALU 662 may also incorporate a thirty-two bit value from data fields 643 and 644.

The next two ALUs 663 and 664 in the embodiment of FIG. 6b are sixteen-bit wide ALUs. In many cases, ALUs 663 and 664 are used to process source and destination TCP ports retrieved from TCP packet headers. However, ALUs 663 and 664 may operate on other data fields such that associated multiplexors 673 and 674 are needed to direct the proper data field from the bus 605 into ALUs 663 and 664. Out of these two 16-bit ALUs, only ALU 663 requires mask information from data field 645. ALU 664 operates only on reference data from the data field 641 and packet data retrieved from the bus 605. There is no mask information provided to ALU 664.

The fifth ALU, ALU 665, is usually used to examine the protocol field in TCP packet headers. Since the fifth ALU always examines the same data field, no multiplexor is needed. Similarly, the final ALU, ALU 666, always examines the same four flag bits in packet headers. Specifically, ALU 666 examines the SYN, Ack, and Fin flag bits from packet headers. A direction flag (DIR) is supplied by the network port controller (NPC) or the Network Interface Control (NIC) that receives and transmits packets between its ports. The direction flag usually specifies an inbound or outbound direction for a packet. ALU 666 also examines four enable/disable bits for each of the four flag bits examined.

When the arithmetic logic units have completed their processing the operation output may be sent out on the bus 605. Alternatively, for rules that maintain a state, the output may be placed back into the RAM 620 through the write-back register 630.

The Rules Stored in the Nanocomputer (or AS Block)

As set forth in the previous section, the rule SRAM 620 in the nanocomputer 600 stores rule information. In one embodiment, the rule information is stored with a twenty-eight bit coded control word portion and a one hundred and eight bit data portion. The twenty-eight bit coded control word determines how the ALUs will interpret the one hundred and eight bit data portion of the rule entry.

The following table lists one possible subset of data field formats that may be used for packet classification operations such as IP Routing, Firewall packet filtering, and QoS Classification.

DIPM_lo=16 low bits of a Destination IP Mask
DIPM_hi=16 high bits of a Destination IP Mask
SP=Source TCP Port
DP=Destination TCP Port
SPDP=A concatenated Source TCP and Destination TCP port
SPM=Source TCP port Mask
DPM=Destination TCP Port mask
Protocol=The eight protocol bits in a TCP header
Flags/enable=The SYN, Ack, Fin and DIR flag bits and associated enable/disable bits The data field formats of Table 1 provide a good set of permutations of various packet header fields that are most often used for firewall packet filtering. However, the limited set of Table 1 is not exhaustive. Many other permutations exist and other packet header fields may be examined. The coded control word portion of a rule determines which of the data field formats in Table 1 will be used.

Composite Rules

Although the firewall rule format has been design to accommodate the majority of typical firewall rule condition parameters, there will be some more complex rules that cannot be expressed within the confines the single 28-bit, control word and 112-bit data field of each rule cell. A rule may require a multiple comparisons on the same packet data fields such that the same data field would need to be distributed to more than just one arithmetic unit.

To handle more the more complex firewall rules, the Array of Cells engine has been designed such that firewall rules may be expanded. Composite rules allow for additional data field comparisons by combining the results of up to four (or less) rules and presenting the overall result in the same processing cycle, as any other single (non-composite) rule.

To handle more the more complex firewall or classification rules, the array of cells engine has been designed such that rules may be expanded by means of "composite rules". Composite rules allow for additional data field comparisons by combining the results of up to four (or less) rules and presenting the overall result in the same processing cycle, as

TABLE 1

| Data field 1 | Data field 2 | Data field 3 | Data field 4 | Data field 5 | Data field 6 |
|---|---|---|---|---|---|
| SIP[32] | DIP[32] | SP[16] | DP[16] | Protocol[8] | Flags/enable[8] |
| SIP[32] | SPDP[32] | SPM[16] | DPM[16] | Protocol[8] | Flags/enable[8] |
| DIP[32] | SPDP[32] | SPM[16] | DPM[16] | Protocol[8] | Flags/enable[8] |
| SIP[32] | DIP[32] | SP[16] | SPM[16] | Protocol[8] | Flags/enable[8] |
| SIP[32] | DIP[32] | DP[16] | DPM[16] | Protocol[8] | Flags/enable[8] |
| SIP[32] | SIPM[32] | SP[16] | DP[16] | Protocol[8] | Flags/enable[8] |
| DIP[32] | DIPM[32] | SP[16] | DP[16] | Protocol[8] | Flags/enable[8] |
| SIP[32] | SIPM[32] | SP[16] | SPM[16] | Protocol[8] | Flags/enable[8] |
| SIP[32] | SIPM[32] | DP[16] | DPM[16] | Protocol[8] | Flags/enable[8] |
| DIP[32] | DIPM[32] | SP[16] | SPM[16] | Protocol[8] | Flags/enable[8] |
| DIP[32] | DIPM[32] | DP[16] | DPM[16] | Protocol[8] | Flags/enable[8] |
| SIP[32] | DIP[32] | DIPM_lo[16] | DIPM_hi[16] | Protocol[8] | Flags/enable[8] |
| SIP[32] | SIPM[32] | DIP_hi[16] | DIP_lo[16] | Protocol[8] | Flags/enable[8] |

Wherein:
SIP=Source IP address
DIP=Destination IP address
DIP_hi=16 high bits of a Destination IP address
DIP_lo=16 low bits of a Destination IP address
SIPM=Source IP address Mask
DIPM=Destination IP address Mask any other single (non-composite) rule. A composite rule can be formulated over rules present in adjacent nanocomputers, belonging to the same rib and present in the same row of RAM cells.

Composite rules are used to perform complex comparisons on a limited number of data packet fields in a single cycle. These rules operate by linking together the processing capabilities of adjacent nanocomputer units. Referring to FIG. 6a, each nanocomputer is linked to the adjacent nanocomputer with a "next match" output signal being given to a "previous match" input signal. For example, next match signal 620 of nanocomputer 621 is connected to the previous match signal of nanocomputer 622. The next match signal informs the adjacent nanocomputer if a rule match has been detected in the previous nanocomputer. Thus, in FIG. 6a, if a match occurs in nanocomputer 621 then the next match signal 620 is asserted such that nanocomputer 622 is notified when nanocomputer 621 has a rule match. Note that a data transfer path (not shown) between adjacent nanocomputers may exist in addition to the next match signals connecting adjacent nanocomputers. The data transfer path may be used to transfer data between adjacent nanocomputers as will be described in the sections on pattern matching.

To create a composite rule, a nanocomputer is informed that it should not assert its match signal going the rib bus control unit. Instead, the nanocomputer only asserts the next match signal when a match occurs. The last nanocomputer in a series of linked nanocomputer asserts its match signal if that nanocomputer detects a match and all the other nanocomputers in the linked series detect a match. The last nanocomputer in a composite rule always asserts its next match signal high for the next nanocomputer.

Figure 7A:
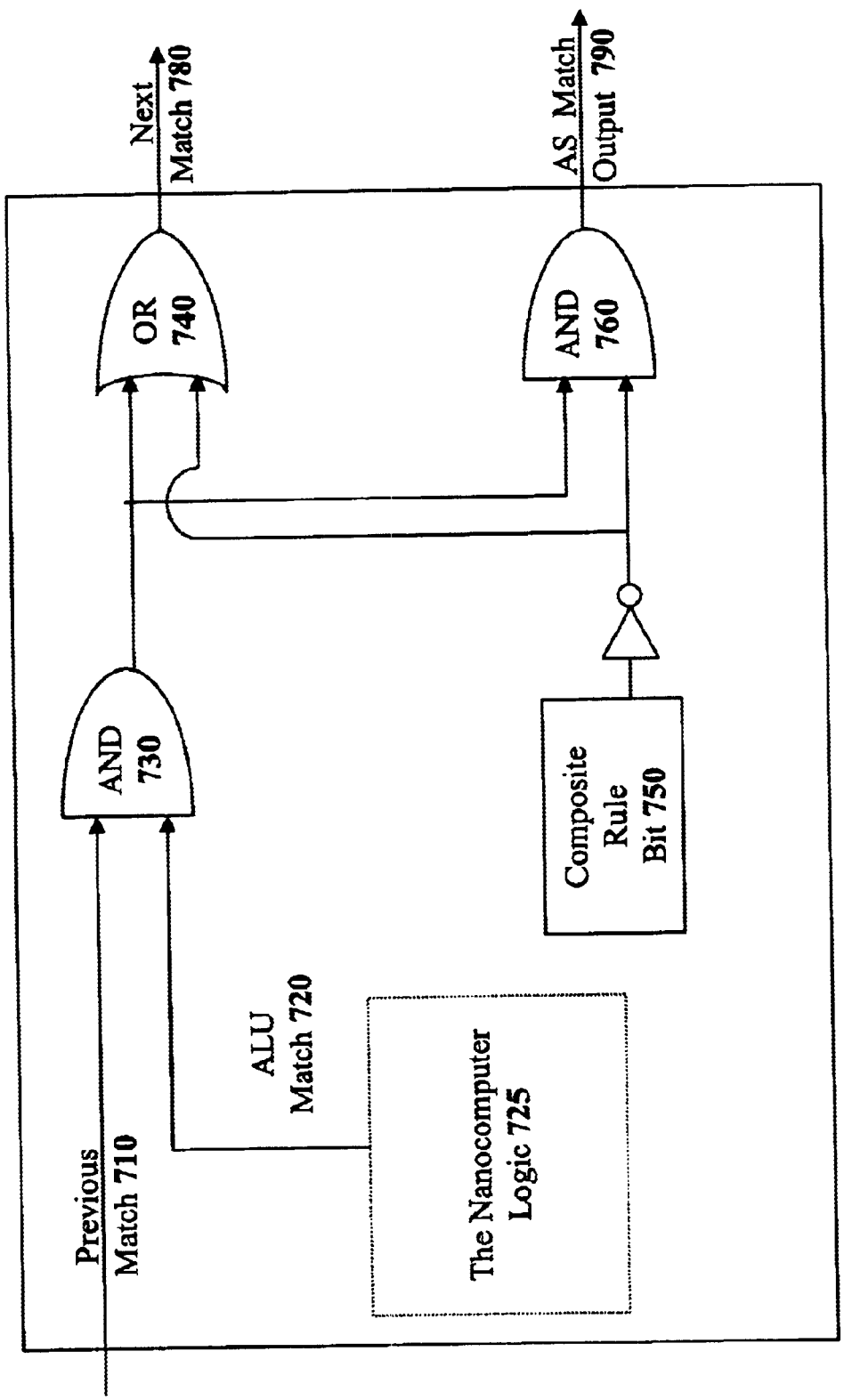
FIG. 7a illustrates one embodiment of nanocomputer circuitry that allows for composite rules using multiple nanocomputers.

FIG. 7a illustrates one possible logic embodiment for the composite rule logic that resides in each nanocomputer. Referring to FIG. 7a, each nanocomputer unit includes a composite rule bit 750 that specifies if the nanocomputer is in the beginning or middle of a composite rule. When the composite rule feature is not being used, the composite rule bit 750 is clear in every nanocomputer. However, when the composite rule feature is being used, all of the nanocomputers in a composite rule have their composite rule bit set except for the last nanocomputer in the composite rule series. For example, in a four nanocomputer wide composite rule, the first three nanocomputers will have set their composite rule bits. Only the final (end) nanocomputer will have this bit clear. In addition, any other single rule that is not a part of a composite rule will have the composite rule bit clear. The composite rule bit determines how the next match 780 and AS_match 790 output signals will operate.

When the composite rule bit 750 is clear, the nanocomputer will output a AS_match signal on match output 790 that specifies if the nanocomputer detects a match (ALU_Match 720) AND the previous nanocomputer specifies a match (previous match 710). Furthermore, when the composite rule bit 750 is clear, the next match signal 780 will be always be asserted. Thus, by asserting the next match signal 780 at the end of each rule, the next nanocomputer's output will only depend on its own match determination. The table below explains the output of match signals based on the previous match signal as well as other relevant signals

TABLE 2

| Input Signals | | | Outputs Signals | |
|---|---|---|---|---|
| Composite Bit 750 | Previous Match 710 | ALU_Match 720 | AS_Match 790 | Next Match 780 |
| 1 | 0 | 0 | 0 | 0 |
| 1 | 0 | 1 | 0 | 0 |
| 1 | 1 | 0 | 0 | 0 |
| 1 | 1 | 1 | 0 | 1 |
| 0 | 0 | 0 | 0 | 1 |
| 0 | 0 | 1 | 0 | 1 |

TABLE 2-continued

| Input Signals | | | Outputs Signals | |
|---|---|---|---|---|
| Composite Bit 750 | Previous Match 710 | ALU_Match 720 | AS_Match 790 | Next Match 780 |
| 0 | 1 | 0 | 0 | 1 |
| 0 | 1 | 1 | 1 | 1 |

Composite bit is reset for all single rules and the highest priority rule in a composite rule.

AS_Match is always low for rules in the beginning or middle of a composite rule set. For all other rules, it depends on the ALU_Match and the Previous Match signals.

AS Match=(Previous Match AND ALU_Match) AND (NOT Composite Rule Bit).

Next Match is always high for single rules and the highest priority rule in a composite rule set. For all other rules, this depends on the ALU_Match and the Previous Match signals Next Match=(NOT Composite) OR (Previous Match AND ALU_Match)

When the composite rule bit 750 is set, the nanocomputer will not assert match signal on the match output signal 790. Instead, the nanocomputer will only send the logical ANDed combination of its own match determination 720 and the match determination from the previous nanocomputers in the composite series, previous match 710. Thus, when the composite rule bit 750 is set, only the next match signal is valid and its own match signal is low.

Figure 7B:
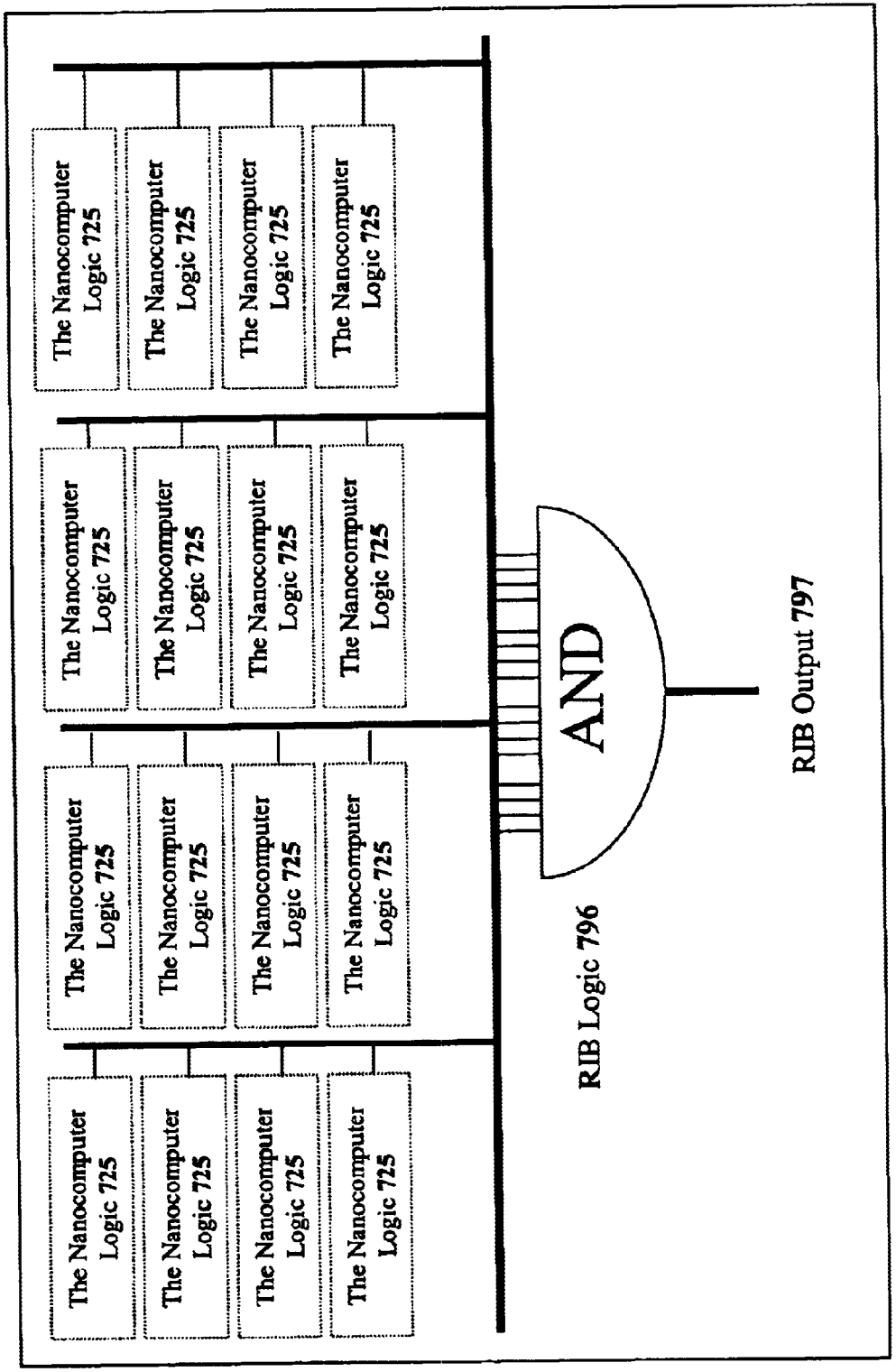
FIG. 7b illustrates one embodiment of circuitry that allows for composite rules using multiple nanocomputers.

FIG. 7b illustrates another possible embodiment for the rule logic that may combine the results from individual nanocomputers. Referring to FIG. 7b, each nanocomputer unit 725 within a RIB block 795, can be configured such that the match signal is output to the RIB block logic 796. In one embodiment there are a maximum of 16 nanocomputers within a single RIB block 795. Each of the nanocomputers 725 independently participate in the classification decision. The logical AND of the match outputs is taken to signal a combined decision.

Pattern Matching in an AoC

The individual nanocomputers in the Array of Cells can be used to perform pattern matching. To perform pattern matching, a special rule containing a pattern matching instruction and pattern data is loaded into one or more nanocomputers. The control system then streams the data to be examined to the individual nanocomputers. If a nanocomputer detects a match between the pattern data and the streamed data, the nanocomputer Signals the match.

The system of the present invention can be used to perform pattern matching on small patterns or large patterns. Small patterns can be searched using individual nanocomputers. Larger patterns require multiple nanocomputers to work cooperatively.

In one embodiment, all patterns which are smaller than 12 bytes in length are considered as short patterns and all other patterns up to a maximum of 192 bytes can be considered as long patterns. This has been described in the previous section titled "The Serial AoC".

Short Pattern Matching

Figure 8:
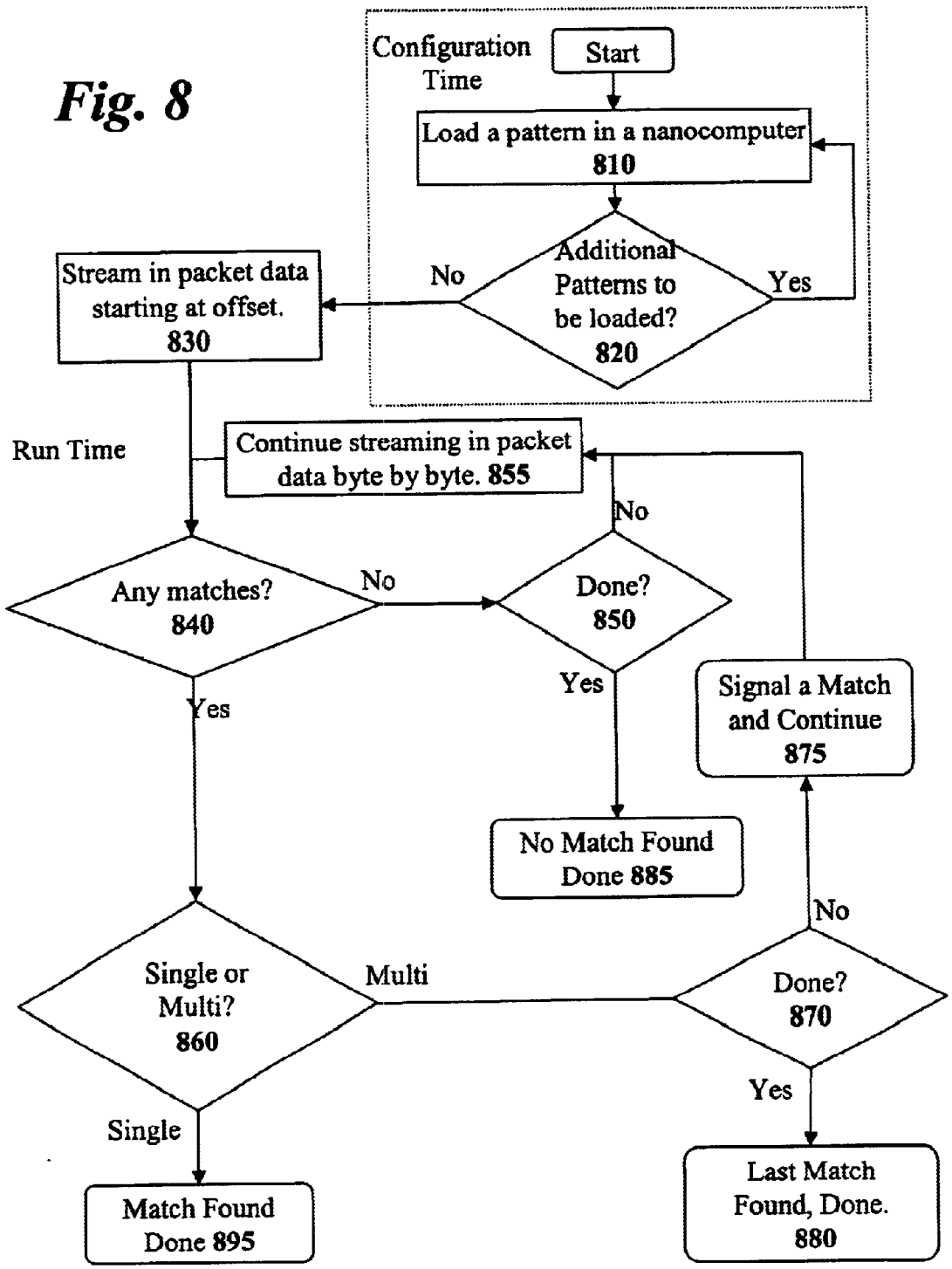
FIG. 8 illustrates the pattern search mechanism for short patterns.

FIG. 8 illustrates a flow diagram that describes how the Array of Cells structure comprising multiple nanocomputers operates to perform pattern matching. Referring to step 810, at configuration time a first small pattern is loaded into a particular rule entry of a nanocomputer. In the nanocomputer embodiment of FIG. 6b, patterns of up to 12 bytes can be searched by combining the operation of ALU unit #1 661, ALU unit #2 662, ALU unit #3 663, and ALU unit #4 664. If a search is to be performed in the reverse direction, then the pattern to be searched is also reversed and written into the nanocomputer.

Next, at step 820, the system determines if there are more small patterns that need to be searched. If there are more patterns to be searched, the system returns to step 810 to load another nanocomputer. Note that the same rule entry position in the next nanocomputer is loaded with the next pattern such that the rules may easily be executed in parallel. Once all the patterns to search have been loaded, the method proceeds to step 830. This completes the configuration of the nanocomputers for a short pattern search.

During run time, at step 830, the system begins streaming the packet data to be searched along the packet distribution bus 602 of the Array of Cells. As previous set forth, the control system begins streaming data from a designated offset value. Furthermore, the data streaming may occur in a forward or reverse manner. At step 840 the method determines if any nanocomputers have detected a match. Referring to FIG. 6b, a nanocomputer determines if a match has been detected by comparing pattern data that has been loaded into data registers 641, 642, 643, and 644 with data that has been streamed into the Packet Header Register 692.

If no nanocomputers have detected a match then the method proceeds to step 850 to determine if the entire data stream (or packet data) has been examined. If the entire data stream has been searched, then the method stops and signals that no match has been detected at step 885. If the entire data stream has not been searched, then the next byte of data is streamed into the Packet Header Register 692 of each nanocomputer at step 855. Again, each nanocomputer tests for matches.

Referring back to step 840, if a nanocomputer detects a match, then the system proceeds to step 860 to determine if the various small patterns are being searched with a single hit or a multi-hit operation. In case the patterns are being searched such that any matching pattern will satisfy the search (single hit), then the system signals a successful match and terminates the search at step 895.

If the various patterns are being searched with a multi hit operation, then step 870 determines if any more packet data remains to be searched. If so then the system signals the match in step 875 and proceeds to step 855 in order to stream in more data. If not then the system proceeds to step 880 to terminate the search and signal the final match.

Large Pattern Matching

Figure 9:
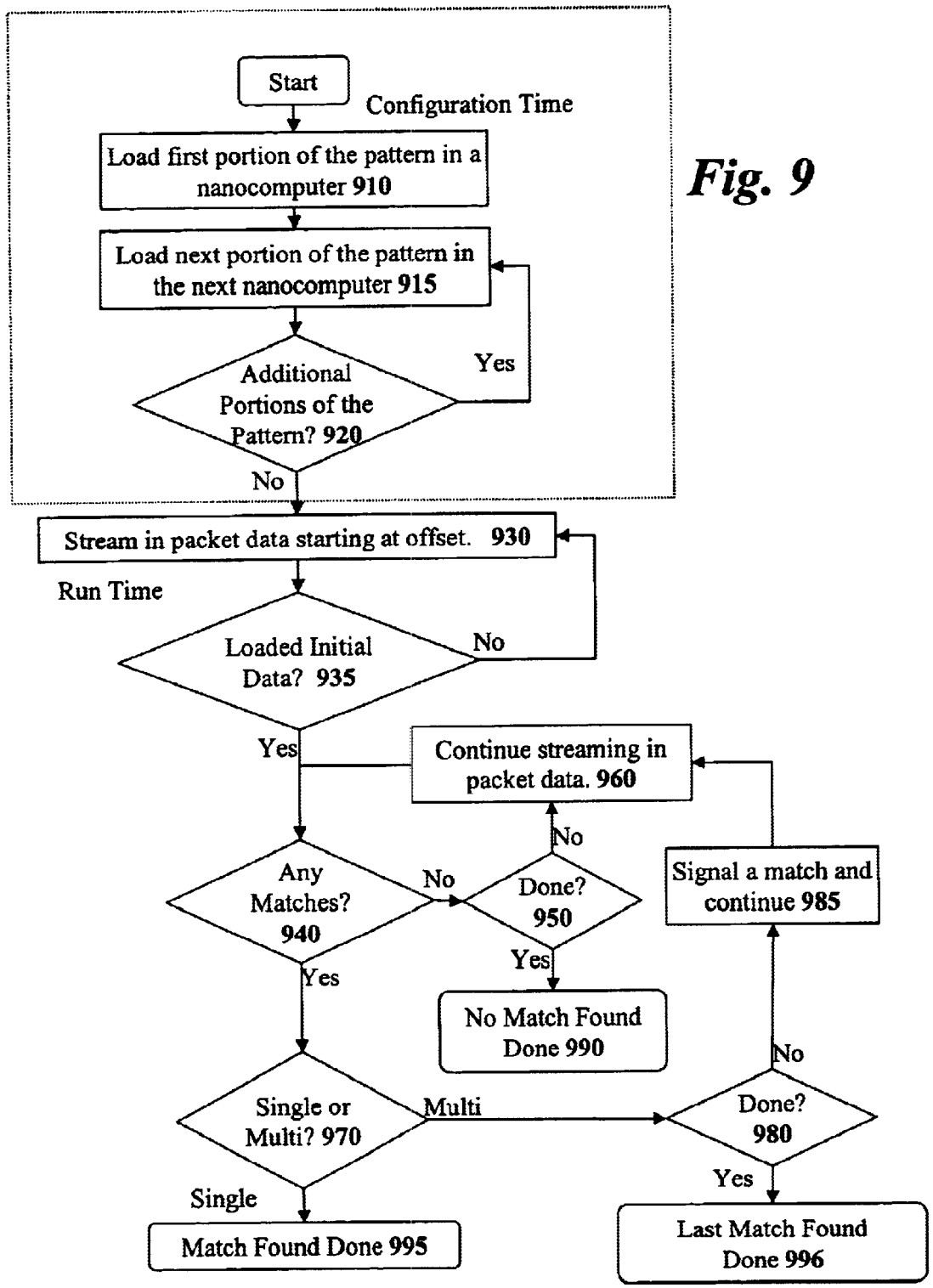
FIG. 9 illustrates the pattern search mechanism for long patterns.

If a pattern to be searched does not fit within the searching capabilities of an individual nanocomputer, then multiple nanocomputers may work together to locate a larger pattern that has been broken into smaller pieces. FIG. 9 illustrates how the present invention uses an array of nanocomputers to locate longer strings. First, at configuration time, at step 910, the system loads in a first portion of the pattern into a first nanocomputer. Next, at step 915, the system loads in a next portion of the pattern to be searched into the next nanocomputer. Furthermore, the method links the first nanocomputer with the next nanocomputer using the chained match logic of FIGS. 7a or 7b.

Next, at step 920, the method determines if there are more portions of the pattern to be loaded. If there are additional portions to be loaded, then the method returns to step 915 to add the additional pattern portions and link the nanocomputers. It should be noted that the last nanocomputer of the chain should include an instruction or data that indicates the "extra" portions of the rule data that do no contain pattern data should always successfully match. In a preferred embodiment, cooperative nanocomputers should occupy the same "rib" of the array of cells.

After all the nanocomputers have been loaded with the portions of the overall large pattern, the system begins streaming data at step 930. Similar to the process described above, the data is loaded into multiple adjacent nanocomputers form a single rule or pattern to be matched. In this step since as long patterns are being searched for, multiple load cycles need to be performed in order to load the initial data. In the embodiment described above up to 192 bytes of data are loaded initially. When sufficient data is loaded to start the pattern matching process, a processing cycle is performed. This check is performed in step 935. At step 940, the control logic determines if all the participating nanocomputers in a given rule have detected a match. In the embodiment described, up to 16 nanocomputers may be aggregated together to match a specific pattern. Note that the unified match detection may be performed using the chained match logic disclosed with reference to FIG. 7b. If all the nanocomputers for a particular rule detect a match, then the method proceeds to step 970 to determine if the various large patterns are being searched with a single hit or a multi-hit operation. In case the patterns are being searched such that any matching pattern will satisfy the search (single hit), then the system signals a successful match and terminates the search as depicted in step 995 of FIG. 9.

If a match has not been detected, the method proceeds to step 950 to determine if all the data to be searched has been streamed. If all the data has been searched, then the method signals that no match was detected and terminates the search as depicted in step 990 of FIG. 9. If all the data has not been searched yet then the method proceeds to step 960 wherein another unit of data is streamed into the nanocomputer on one "end" of the linked nanocomputers. The existing data within the nanocomputers is shifted through the packet header register. Referring to FIG. 6b, data that shifts out of an adjacent nanocomputer 689 when shifting left shifts into the packet header register of 692 of the current nanocomputer. Similarly, the data shifting left out of packet register 692 shifts into the next adjacent nanocomputer 698. The nanocomputers then again test the data against the pattern portions.

If the various patterns are being searched with a multi hit operation, then step 980 determines if any more data remains to be searched. If so then the system signals the match in step 985 and proceeds to step 960 in order to stream in more data. If not then the system proceeds back to step 996 to terminate the search and signal a match.

Complex Pattern Matching

A system may create more complex pattern matching tasks by using the pattern matching primitives of the nanocomputers with the control system of the Packet Inspector Engine. The following section describes how operation of the packet inspector engine may be controlled with conditional branches.

AoC Control System

As previously set forth, the operation of the Array of Cells is controlled by Command Words (CWords) and Operation Cycle descriptors (OCs).

OC Sequencing

The Packet Inspector Engine (PIE) is capable of running different Operating Cycles on the same packet data. This is done by either using a fixed number of OC Identifiers or it is accomplished by using sequencing information available in Control RAM Operation C-Words. The sequencing done using CRAM C-Words provides greater power and flexibility.

Following the first 64-bit Packet Information, the subsequent 64-bit data field can be a Packet OC Conductor. The OC Conductor either contains a C-Word Address or can contain four 16-bit OC Identifiers. The PIE has an on chip OC Conductor Register that contains information organized exactly as the OC Conductor received through the HEE interface. If no OC Conductor is specified with a packet then the OC Conductor value stored in this register used by default. If the OC Conductor comes with the packet via the HEE, then the register value is ignored.

Sequencing using OC Identifiers

As previously set forth, each OC Identifier consists of 16-bit that are interpreted as follows:

OC Descriptor Index: These six bits are an OC Descriptor Index and specify the index of the descriptor in the OC Descriptor table that will be used for running the OC.

PIE Selectors: These eight bits specify which range of the eight PIEs in a cascade arrangement will participate in the operating cycle (OC).

Execution Bit: The Identifier is used to run an OC if this execution bit is set.

If the OC Conductor specifies that it contains OC Identifiers then the first Identifier is always run.

Each OC Identifier thus identifies the chips in the cascade that will participate in the OC and for all the participating chips it specifies the descriptor that each chip will use.

The PIE chip executes the four OC Identifiers one by one and on completion of the last OC, the PIE chip terminates packet processing on the current packet data. Thus using OC Identifiers, a maximum of only four OCs can be executed on packet data. The Operation CWords in Control RAM are not used.

Sequencing using Control RAM

The CRAM has two segments, which stores Operation C-Words. Each Operation C-Word contains a field that is similar to the OC Identifier and is used for running an OC. It contains a Branch Condition and finally a branch address (which is used for certain branch Opcodes and ignored for others).

The OC Conductor (either stored in the OC Conductor Register or coming via the HEE) can specify a Control Word Address instead of OC Identifiers. If it specifies a C-Word address then the C-Word at that address is fetched and is interpreted as an Operation C-Word. An OC is run using the OC Identifier field in the C-Word. After completion of the OC, the next C-Word to choose for execution depends on the Branch Condition specified in the Branch Opcode. If the next OC is a pattern search, then the next data which the AOC 300 receives can be specified either as a relative offset or as an absolute offset in the C-Word. In case the offset is absolute the HEE extracts the data from the relevant offset. In case the offset is relative then the HEE will proceed in the forward or reverse direction and fetch data from the specified offset bytes in the C-Word, from the point at which the last match occurred depending on the direction of search being performed. The following branch conditions are possible:

Unconditional Branches:
a) Continue
b) Terminate
c) Goto C-Word Address
d) Call C-Word Address
e) Return Conditional Branches:
f) Goto Matched Cell C-Word Address else Continue
g) Call Matched Cell C-Word Address else Continue
h) Goto Matched Cell C-Word Address on Match else Terminate
i) Call Matched Cell C-Word Address on Match else Terminate
j) Goto Matched Cell C-Word Address on Match else Goto C-Word Address
k) Call Matched Cell C-Word Address on Match else Call C-Word Address After executing the operating cycle (OC), the PIE examines the branch Opcode.

a) If the Opcode is Continue then the PIE fetches the C-Word at the following address and executes that.
b) If the Opcode is Terminate, then the PIE stops further OC execution and assumes that packet processing for the current packet data is complete.
c) If the Opcode is Goto C-Word Address then the PIE fetches the C-Word whose address is specified in the Branch Address Field of the current C-Word and executes the fetched C-Word
d) If the Opcode is Goto Matched Cell C-Word Address else continue then it indicates a conditional branch condition. If the current OC produced a match, then the Operation C-Word corresponding to the C-Word which matched is fetched and executed. If the C-Word did not produce any match then by default the C-Word at the location following the current location is fetched and executed.
e) If the Opcode is Goto Matched Cell C-Word Address else Terminate then action is taken as in defined in the previous item above on a Match, but if the Match fails then the OC Sequence is terminated and further packet processing is stopped.
f) If the Opcode is Goto Matched Cell C-Word Address else Goto C-Word Address then action is taken as in defined in the previous item above on a Match, but if the Match fails then the C-Word whose address is specified in the Branch Address field is fetched and executed.
g) The PIE can store a single C-Word address to be used as a return address. This acts like a single entry last-in/first-out (LIFO) stack. If any Branch Opcode is a Call Opcode, then address of the current C-Word is stored in this single entry stack. On encountering any Return Opcode thereafter, the PIE returns to executing the C-Word just after the address stored in the one entry stack. As the stack is single entry it implies that if two Call Opcodes occur without any intervening Return then the second Call will cause the stack entry to be overwritten with the address of the C-Word storing the second Call.

Control Sequencing Operation

Figure 10A:
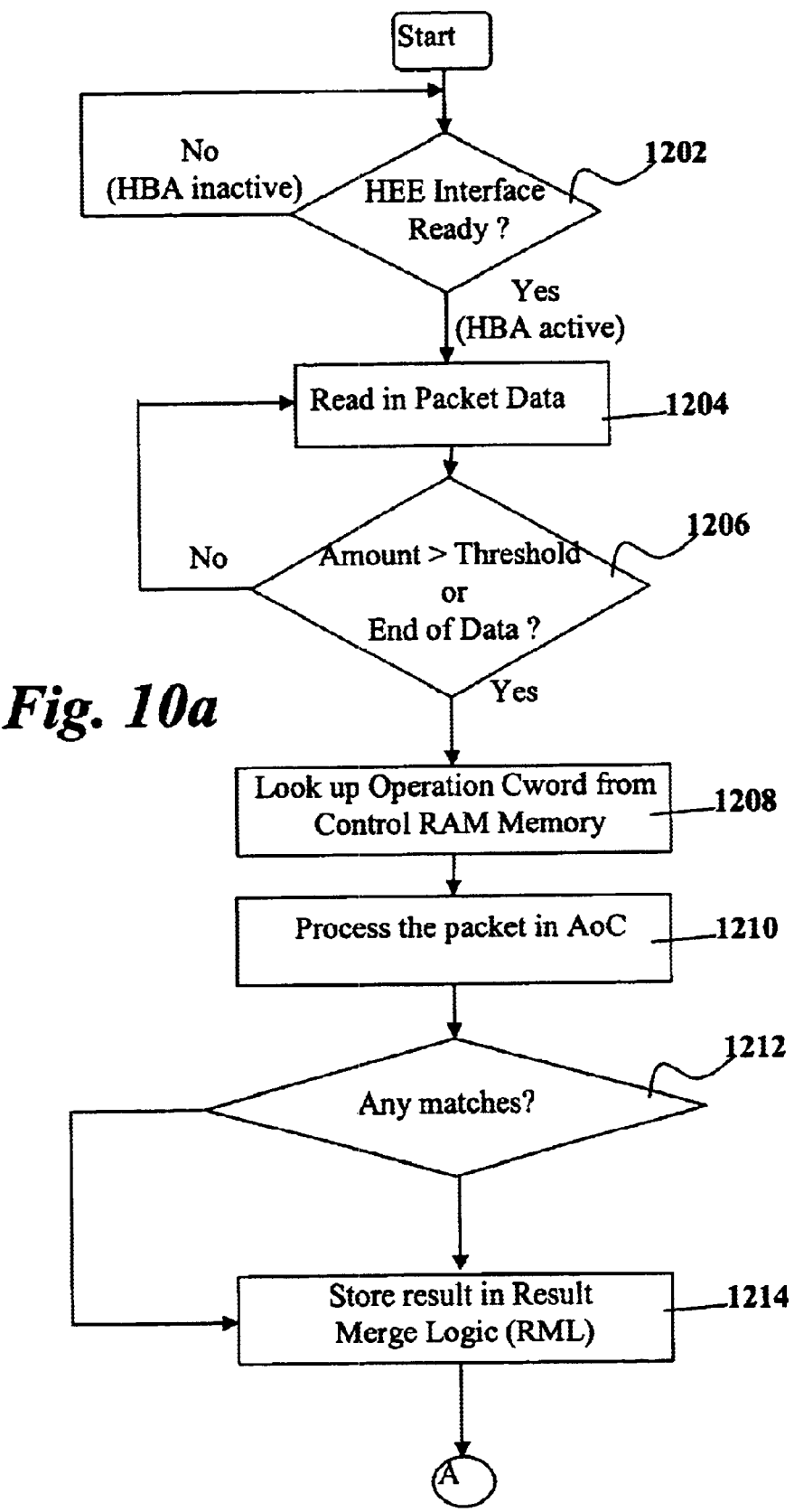
FIGS. 10a and 10b illustrate a process flowchart of the control system according to one embodiment of the present invention.
Figure 10B:
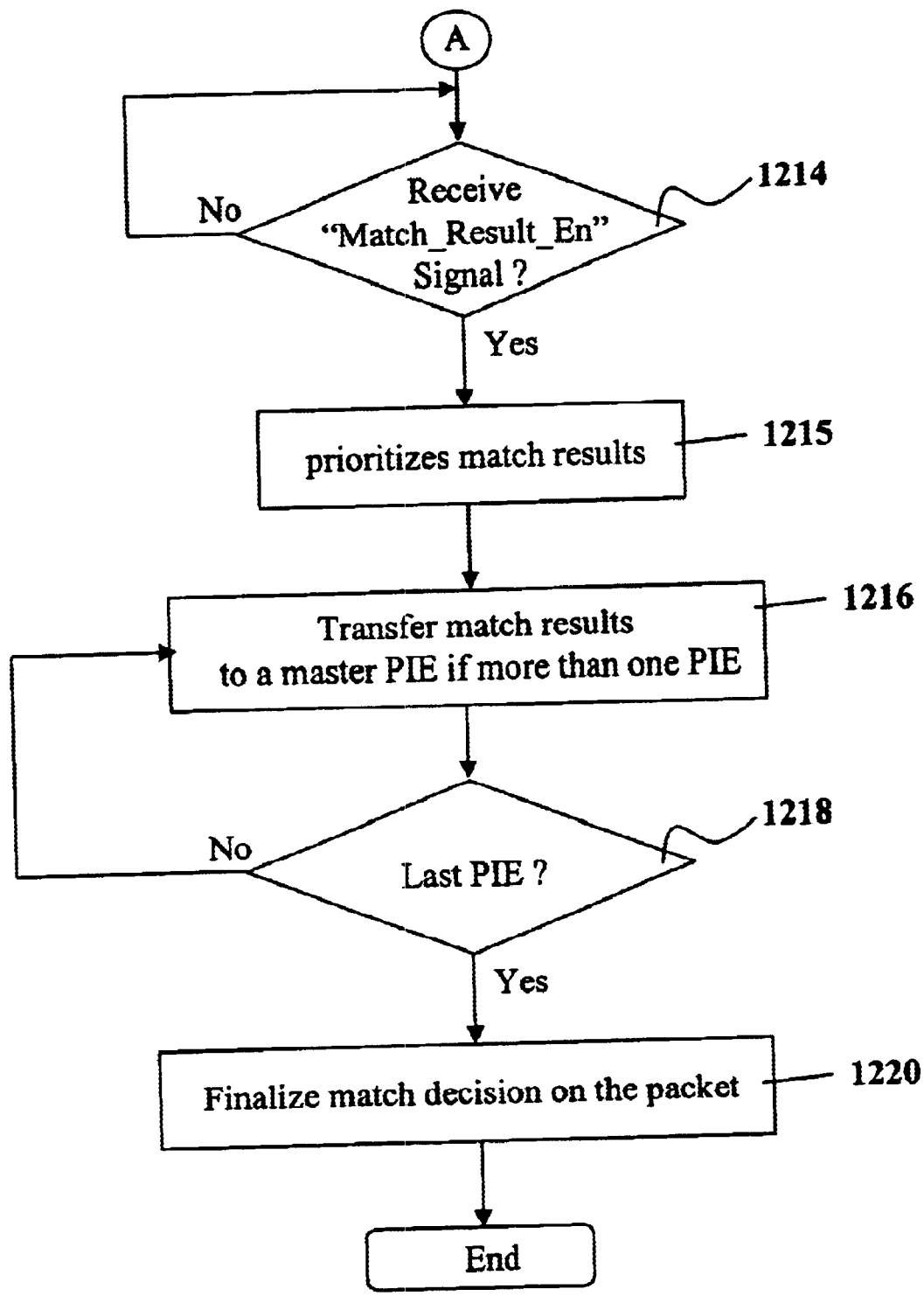

FIGS. 10a and 10b illustrate a processing flowchart of the operations of the control system for high-peed rule processors according to one embodiment of the present invention. FIGS. 10a and 10b should be understood in conjunction with FIGS. 2a, 3a, 3b, and 4a. At step 1202, port processor 294 detects if a signal "HEE Buffer Available" or HBA is sent out from HEE 330. With HBA being inactive, no packet information will be received in the HEE 330. As soon as HBA is present (active), 32-bit or 64-bit packet information is presented to the HEE 330. At 1204, the packet information is read in and stored accordingly in HEE registers 316. To prevent data overflow, the HEE 330, as described above, maintains a pair of registers storing thresholds indicating how much data HEE 330 can accommodate for subsequent processing in AoC 300.

At step 1206, HEE 330 consults to the thresholds and determines if the packet information being received exceeds the thresholds. When the packet information is fully read in, the PIE consults the operation CWord originally from Control RAM memory 390 through the cascade bus 307 at step 1208. As described above, the CWord is sequenced and pertinent bits are respectively stored in AoC registers 314. According to the contents in AoC registers 314, the packet data from the HEE 330 are forwarded to AoC 300 for processing at step 1210.

As described above, each cell in AoC 300 process the packet data according to its own allocated rules and parameters depending on the exact application of a gateway at step 1212. If the packet data match any of the rules and parameters, the match results (packet decision) are stored in a logic circuit called Result Merge Logic (RML) 362 at step 1214. If there are not any matches in the processing at step 1212, the no-match decision may be stored in RML 362 at step 1214 or simply discarded.

When there are multiple PIES configured for cascading operation, each of the PIES goes through the same process steps 1202 to 1214. Generally, multiple PIES are sequentially labeled by an identifier (identity) and there is a master PIE and the rest are considered slave PIES. At step 1215, the multiple PIES determine the priority of each of other PIES by examining the respective identity of each of the other PIES. At step 1214, the master PIE sends out a signal "Match_Result_En" which enables the slave PIES to release the respective match results to the master PIE. Upon detecting the presence of the signal, the RML 362 in the slave PIES start sequentially to release the content therein to the master PIE at step 1216 through a common data bus all of the PIES are coupled thereto. The order of releasing the match result from each of the slave PIES may be based on the identity of the PIES, typically a higher number of the identity has the result forwarded first. At step 1218, the master PIE determines if all respective match results in the RML of each of the slave PIES have been collected by examining a last identity identifying a last PIE. When the last identity is reached, i.e. all of the match results are collected, the master PIE forms a match decision at step 1220 on the packet whose information has been just processed.

Pattern Matching Constructs

We note that with the use of the above functionality various types of patterns can be matched. In particular the above implementation describes how a system which can be used to parse regular expressions can be built. The system supports the following basic features that are sufficient to support regular expression parsing.

Compare (AOC rules)
Shift to right (relative offsets)
Conditional parsing (if then else within the C-Word)
Wildcarding (move ahead for one or more characters as shown in 850, 870, 950, 980)
Masking (don't care's within the AOC rule definition)

Thus the HEE 330, the AOC 300, the Control RAM logic 320 and the Command Wordw stored in the control RAM 390 described can be used in conjunction to implement a regular expression parsing engine.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A method for locating patterns in a data packet, said method comprising:
    distributing a first pattern to a first nanocomputer in an array of nanocomputers; and
    distributing a second pattern to a second nanocomputer in an array of nanocomputers; and
    streaming data from said data packet to said array of nanocomputers;
    comparing, within said first and second nanocomputers, said streamed data against said first and second patterns, respectively; and
    signaling a match when at least one of said nanocomputers has detected a match.

2. The method as claimed in claim 1 wherein streaming data from said data packet starts from a defined offset in said data packet.

3. The method as claimed in claim 1 wherein streaming data from said data packet comprising streaming data from said data packet in a reverse direction.

4. The method as claimed in claim 3 wherein said first pattern and said second pattern are reversed.

5. The method as claimed in claim 1 wherein signaling a match comprises signaling a match when at least one of said first nanocomputer or said second nanocomputer has detected a match.

6. The method as claimed in claim 1 wherein signaling a match comprises signaling a match when both said first nanocomputer and said second nanocomputer have detected a match.

7. A method for locating patterns in a data packet, said method comprising:
    distributing a first pattern portion of an overall pattern to a first nanocomputer in an array of nanocomputers; and
    distributing a second pattern portion of said overall pattern to a second nanocomputer in an array of nanocomputers; and
    streaming data from said data packet to said array of nanocomputers;
    comparing, within said first and second nanocomputers, said streamed data against said first and second pattern portions, respectively; and
    signaling a match when both said first nanocomputer and said second nanocomputer have detected a match.

8. The method as claimed in claim 7 wherein streaming data from said data packet starts from a defined offset in said data packet.

9. The method as claimed in claim 7 Wherein streaming data from said data packet comprising streaming data from said data packet in a reverse direction.

10. The method as claimed in claim 9 wherein said first pattern and said second pattern are reversed.

11. An apparatus for locating patterns in a data packet, said apparatus comprising:

an array of nanocomputers, each nanocomputer in said array of nanocomputers comprising
a memory,
a bus interface,
at least one arithmetic-logic unit, and
control circuitry for controlling said memory, bus interface, and arithmetic unit;

a bus distribution system, said bus distribution system for distributing information to said nanocomputers using said bus interface within each said nanocomputer;

a control unit for controlling said array nanocomputers cells, said control unit distributing a first pattern to a first nanocomputer, distributing a second pattern to a second nanocomputer, and streaming data from said data packet to said array of nanocomputers; and match detection logic for signaling a match when at least one of said nanocomputers has detected a match.

12. The apparatus as claimed in claim 11 wherein said control unit streams data from a defined offset in said data packet.

13. The apparatus as claimed in claim 11 wherein said control unit streams data from said data packet in a reverse direction.

14. The apparatus as claimed in claim 13 wherein said first pattern and said second pattern are reversed.

15. The apparatus as claimed in claim 11 wherein signaling a match comprises signaling a match when at least one of said first nanocomputer or said second nanocomputer has detected a match.

16. The apparatus as claimed in claim 11 wherein signaling a match comprises signaling a match when both said first nanocomputer and said second nanocomputer have detected a match.

17. An apparatus for locating patterns in a data packet, said apparatus comprising:

an array of nanocomputers, each nanocomputer in said array of nanocomputers comprising
a memory,
a bus interface,
at least one arithmetic-logic unit, and
control circuitry for controlling said memory, bus interface, and arithmetic unit, a bus distribution system, said bus distribution system for distributing information to said nanocomputers using said bus interface within each said nanocomputer;

a control unit for controlling said array nanocomputers cells, said control unit distributing a first pattern portion of an overall pattern to a first nanocomputer, distributing a second pattern portion of said overall pattern to a second nanocomputer, and streaming data from said data packet to said array of nanocomputers; and match detection logic for signaling a match when both said first nanocomputer and said second nanocomputer have detected a match.

18. The apparatus as claimed in claim 17 wherein streaming data from said data packet starts from a defined offset in said data packet.

19. The apparatus as claimed in claim 17 wherein streaming data from said data packet comprising streaming data from said data packet in a reverse direction.

20. The apparatus as claimed in claim 19 wherein said first pattern and said second pattern are reversed.

* * * * *